United States Patent
Oh et al.

(10) Patent No.: US 11,337,188 B2
(45) Date of Patent: May 17, 2022

(54) METHOD AND DEVICE FOR TRANSMITTING/RECEIVING UPLINK CONTROL INFORMATION IN WIRELESS COMMUNICATION SYSTEM

(71) Applicant: Samsung Electronics Co., Ltd., Gyeonggi-do (KR)

(72) Inventors: Jinyoung Oh, Seoul (KR); Youngbum Kim, Seoul (KR); Sungjin Park, Incheon (KR); Jeongho Yeo, Gyeonggi-do (KR); Seunghoon Choi, Gyeonggi-do (KR)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 16/469,949

(22) PCT Filed: Dec. 26, 2017

(86) PCT No.: PCT/KR2017/015494
§ 371 (c)(1),
(2) Date: Jun. 14, 2019

(87) PCT Pub. No.: WO2018/124702
PCT Pub. Date: Jul. 5, 2018

(65) Prior Publication Data
US 2019/0349919 A1 Nov. 14, 2019

(30) Foreign Application Priority Data

Dec. 28, 2016 (KR) .................. 10-2016-0180759
Jan. 6, 2017 (KR) .................. 10-2017-0002579

(51) Int. Cl.
*H04W 72/04* (2009.01)
*H04W 72/12* (2009.01)
(Continued)

(52) U.S. Cl.
CPC ....... *H04W 72/0413* (2013.01); *H04L 1/0004* (2013.01); *H04W 4/70* (2018.02); *H04W 72/0446* (2013.01); *H04W 72/1268* (2013.01)

(58) Field of Classification Search
None
See application file for complete search history.

(56) References Cited

U.S. PATENT DOCUMENTS

2014/0092793 A1* 4/2014 Yang ................ H04B 7/2656
370/280
2015/0078284 A1 3/2015 Lee et al.
(Continued)

FOREIGN PATENT DOCUMENTS

WO WO 2016/040290 3/2016

OTHER PUBLICATIONS

PCT/ISA/210 Search Report issued on PCT/KR2017/015494, pp. 5.
(Continued)

*Primary Examiner* — Ayanah S George
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
The present invention provides a method by which a terminal transmits uplink control information, comprising receiving uplink scheduling information from a base station;
(Continued)

determining, among a plurality of slots, at least one slot for transmitting the uplink control information, based on the uplink scheduling information; and transmitting the uplink control information through the determined at least one slot.

19 Claims, 18 Drawing Sheets

(51) Int. Cl.
*H04W 4/70* (2018.01)
*H04L 1/00* (2006.01)

(56) References Cited

U.S. PATENT DOCUMENTS

| | | |
|---|---|---|
| 2015/0200746 A1* | 7/2015 | Pan .......................... H04L 1/00 370/329 |
| 2016/0234830 A1 | 8/2016 | Kim et al. |
| 2017/0156131 A1* | 6/2017 | Kimura ................ H04L 5/0007 |
| 2017/0290008 A1 | 10/2017 | Tooher et al. |

OTHER PUBLICATIONS

PCT/ISA/237 Written Opinion issued on PCT/KR2017/015494, pp. 6.
Catt, 3GPP TSG RAN WG1 Meeting #87, R1-1611394, Reno, USA, Nov. 5, 2016, NR UL control channel structure, pp. 6.
Samsung, 3GPP TSG RAN WG1#87, R1-1612438, Reno, USA, Nov. 4, 2016, Slot Aggregation, pp. 4.
Huawei, HiSilicon, 3GPP TSG RAN WG1 Meeting #87, R1-1611662, Reno, USA, Nov. 5, 2016, Scheduling scheme for slot aggregation, pp. 6.

* cited by examiner

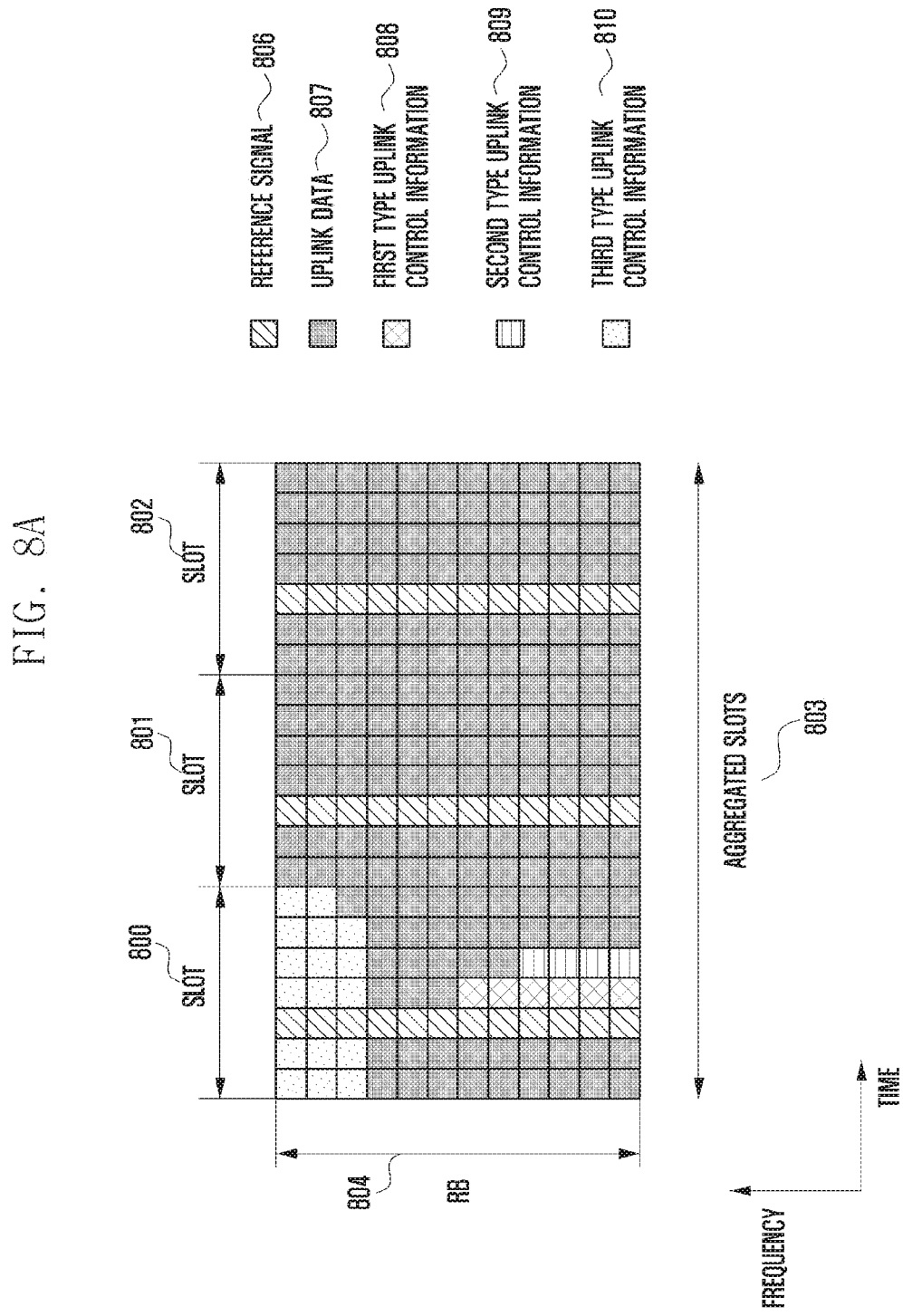

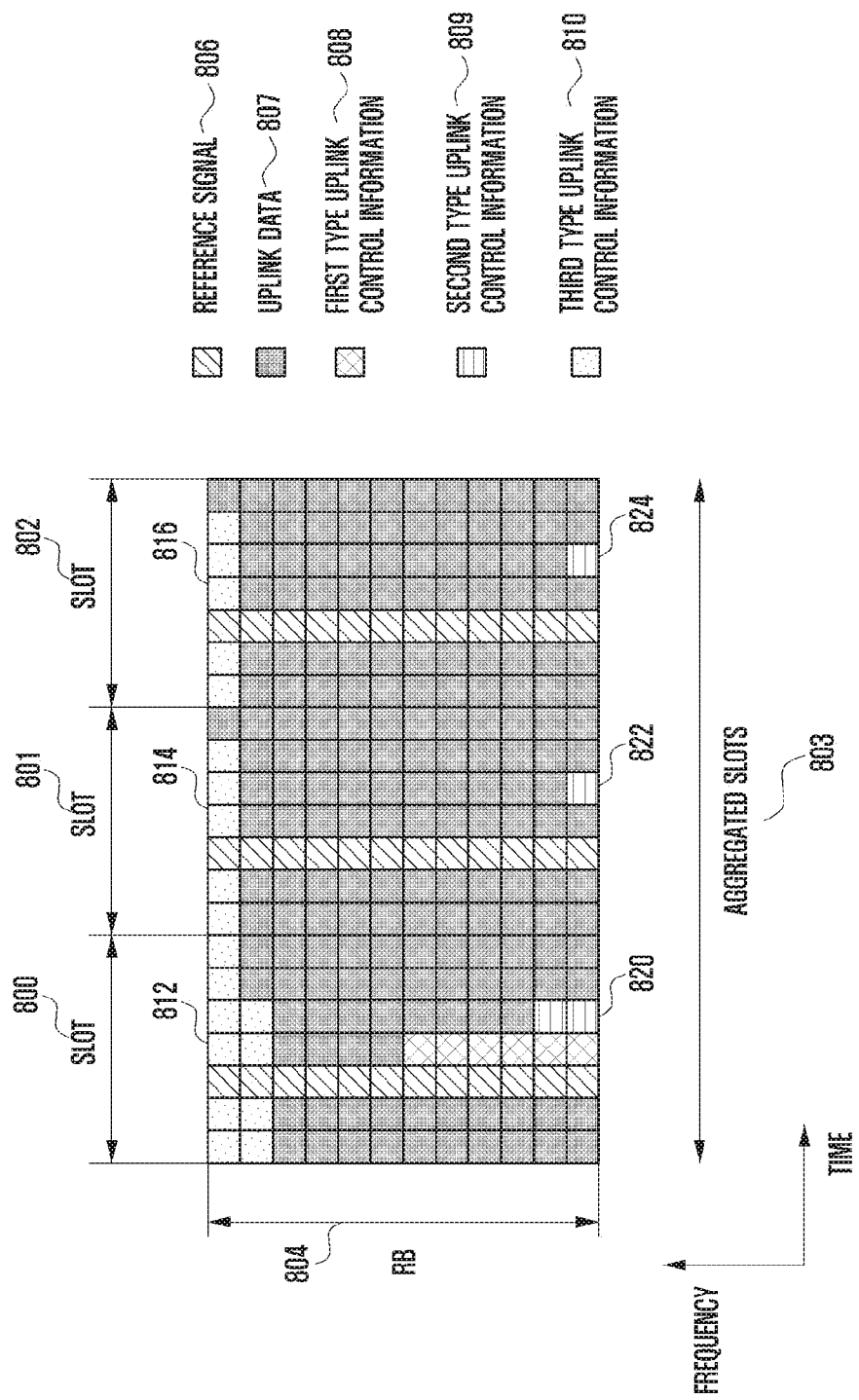

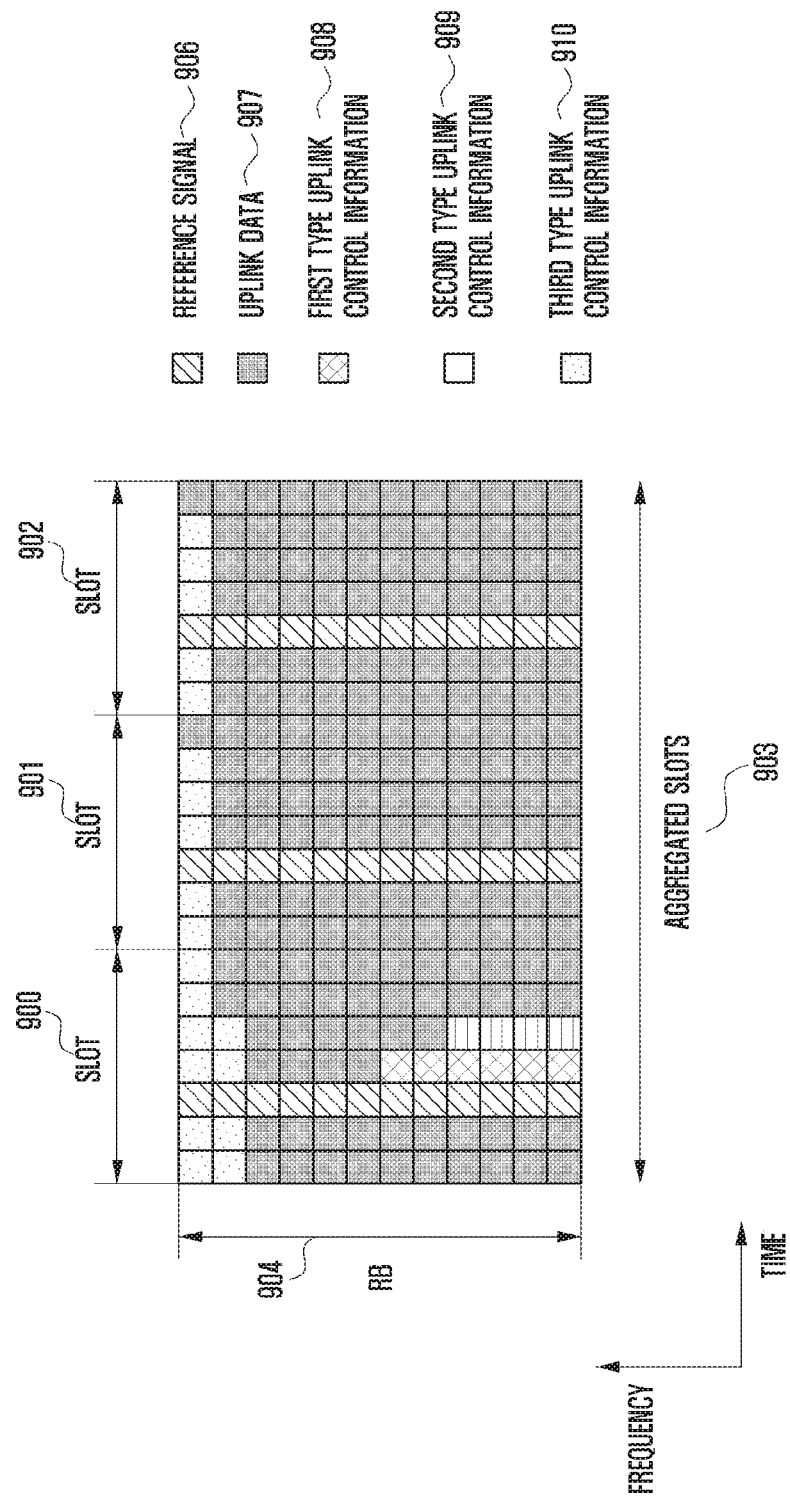

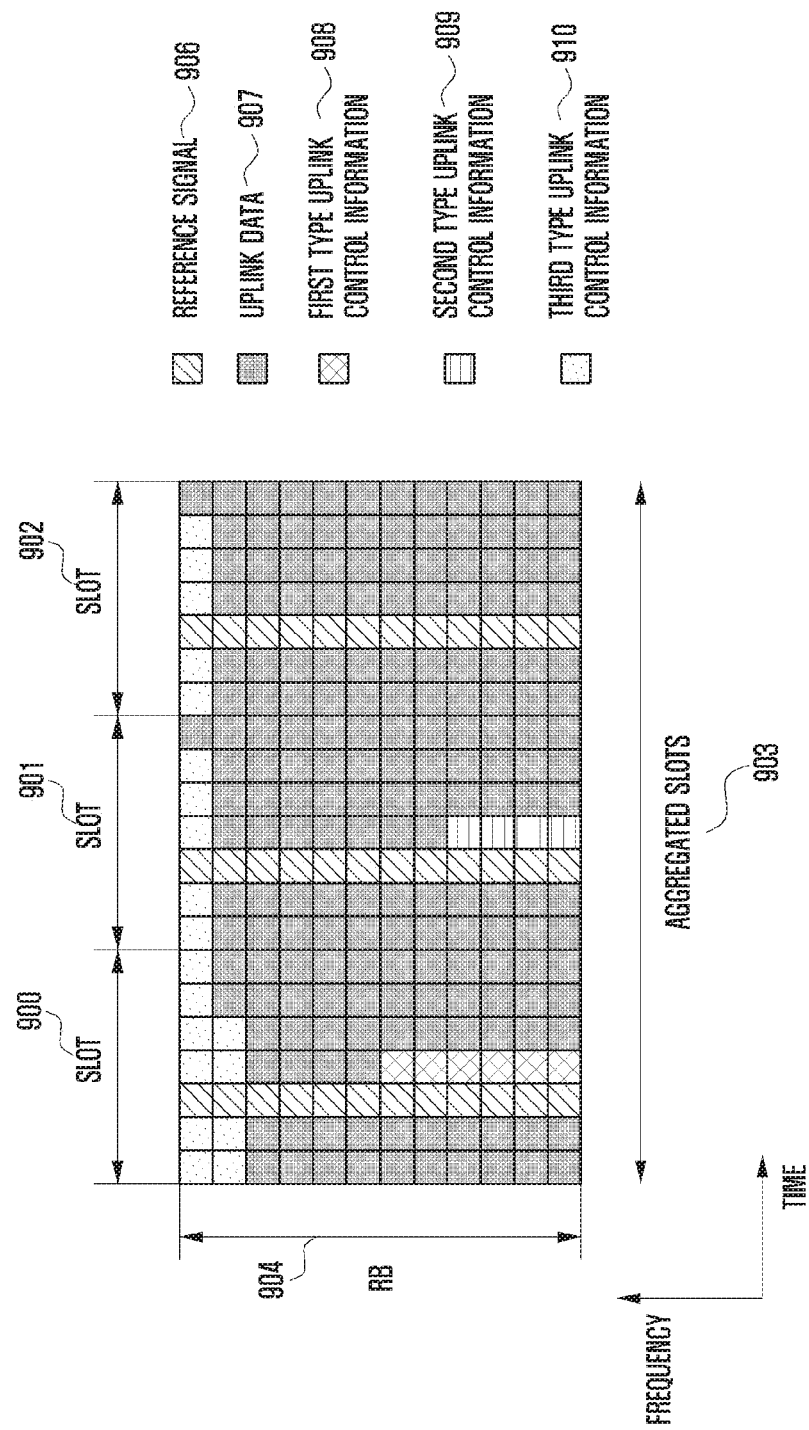

METHOD AND DEVICE FOR TRANSMITTING/RECEIVING UPLINK CONTROL INFORMATION IN WIRELESS COMMUNICATION SYSTEM

PRIORITY

This application is a National Phase Entry of PCT International Application No. PCT/KR2017/015494 which was filed on Dec. 26, 2017, and claims priority to Korean Patent Application Nos. 10-2016-0180759 and 10-2017-0002579, which were filed on Dec. 28, 2016, and Jan. 6, 2017, respectively, the content of each of which is incorporated herein by reference.

TECHNICAL FIELD

The disclosure relates to a wireless communication system, and a method and an apparatus for smoothly providing a service in a communication system. More particularly, the disclosure relates to a method and an apparatus for transmitting and receiving uplink control information within a communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the 5G communication system should be designed to operate while efficiently coexisting with services considered after the 5G communication system. For forward compatibility in the 5G communication system, resources should be freely allocated and transmitted so that services considered in the future can be freely transmitted in a time-frequency resource region supported by the 5G communication system. Accordingly, a need of a method of freely allocating time-frequency resources to support forward compatibility in the 5G communication system has arisen.

DISCLOSURE OF INVENTION

Technical Problem

An aspect of embodiments of the specification is to provide a method and an apparatus for efficiently providing communication between a BS and a terminal or terminals by providing a method of efficiently transmitting and receiving the location of slots in which uplink control information is transmitted, control information, and data information when the terminal desires to transmit uplink control information and uplink data through one or more uplink transmission slots.

Solution to Problem

In accordance with an aspect of the disclosure, a method of transmitting uplink control information by a terminal in a wireless communication system includes: receiving uplink scheduling information from a base station (BS); determining at least one slot for transmitting the uplink control information, based on the uplink scheduling information, among a plurality of slots; and transmitting the uplink control information through the at least one determined slot.

The scheduling information may include an indicator indicating at least one slot for transmitting the uplink control information and wherein the determining of the at least one slot may include determining at least one slot for transmitting the uplink control information, based on the indicator.

The scheduling information may include an indicator for requesting to transmit a channel state report or the uplink control information, and wherein the determining of the at least one slot may include determining at least one slot for transmitting the uplink control information, based on the indicator.

The method of transmitting the uplink control information by the terminal may further include: receiving, from the base station, configuring information for transmitting the uplink control information through the plurality of slots; when a number of slots for transmitting the uplink control information is determined to be plural, distributing the uplink control information to each slot; and transmitting the uplink control information through the plurality of slots based on the configuration information.

In accordance with another aspect of the disclosure, a method of receiving uplink control information by a base station (BS) in a wireless communication system includes: transmitting uplink scheduling information to a terminal; and receiving the uplink control information through at least one slot determined based on the uplink scheduling information among a plurality of slots.

The scheduling information may include an indicator indicating at least one slot for receiving the uplink control information, and wherein the receiving of the uplink control information may include receiving the uplink control information through the at least one slot determined based on the indicator.

The scheduling information may include an indicator for requesting to transmit a channel state report or the uplink control information, and wherein the receiving of the uplink control information may include receiving the uplink control information through the at least one slot determined based on the indicator.

The method of receiving the uplink control information by the BS may further include transmitting configuration information for receiving the uplink control information to the terminal through the plurality of slots, wherein the receiving of the uplink control information may include receiving the uplink control information through the plurality of slots determined based on the uplink scheduling information and the configuration information.

In accordance with another aspect of the disclosure, a terminal in a wireless communication system includes: a transceiver; and a controller configured to control the transceiver to receive uplink scheduling information from a base station (BS), determine at least one slot for transmitting the uplink control information, based on the uplink scheduling information among a plurality of slots, and control the transceiver to transmit the uplink control information through the at least one determined slot.

The scheduling information may include an indicator indicating at least one slot for transmitting the uplink control information and wherein the controller may determine at least one slot for transmitting the uplink control information, based on the indicator.

The scheduling information may include an indicator for requesting to transmit a channel state report or the uplink control information, and wherein the controller may determine at least one slot for transmitting the uplink control information, based on the indicator.

The controller may control the transceiver to receive configuring information for transmitting the uplink control information from the BS through the plurality of slots and, when a number of slots for transmitting the uplink control information is determined to be plural, distribute the uplink control information to each slot, and control the transceiver to transmit the uplink control information through the plurality of slots, based on the configuration information.

In accordance with another aspect of the disclosure, a base station (BS) in a wireless communication system includes: a transceiver; and a controller configured to control the transceiver to transmit uplink scheduling information to a terminal and control the transceiver to receive the uplink control information through at least one slot determined based on the uplink scheduling information.

The scheduling information may include an indicator indicating at least one slot for receiving the uplink control information and the controller may control the transceiver to receive the uplink control information through the at least one slot determined based on the indicator.

The scheduling information may include an indicator for requesting to transmit a channel state report or the uplink control information, and the controller may include the transceiver to receive the uplink control information through the at least one slot determined based on the indicator.

Advantageous Effects of Invention

The disclosure provides a method and an apparatus for efficiently using at least one of frequency-time resources, spatial resources, and transmission power by providing a method of efficiently transmitting and receiving uplink control information and data when the terminal desires to transmit uplink control information and uplink data through one or more uplink transmission slots in a communication system.

BRIEF DESCRIPTION OF DRAWINGS

FIGS. 8A, 8B, 8C, 9A, 9B, 10A, and 10B illustrate embodiments of a method proposed by the disclosure;

BEST MODE FOR CARRYING OUT THE INVENTION

Figure 1:
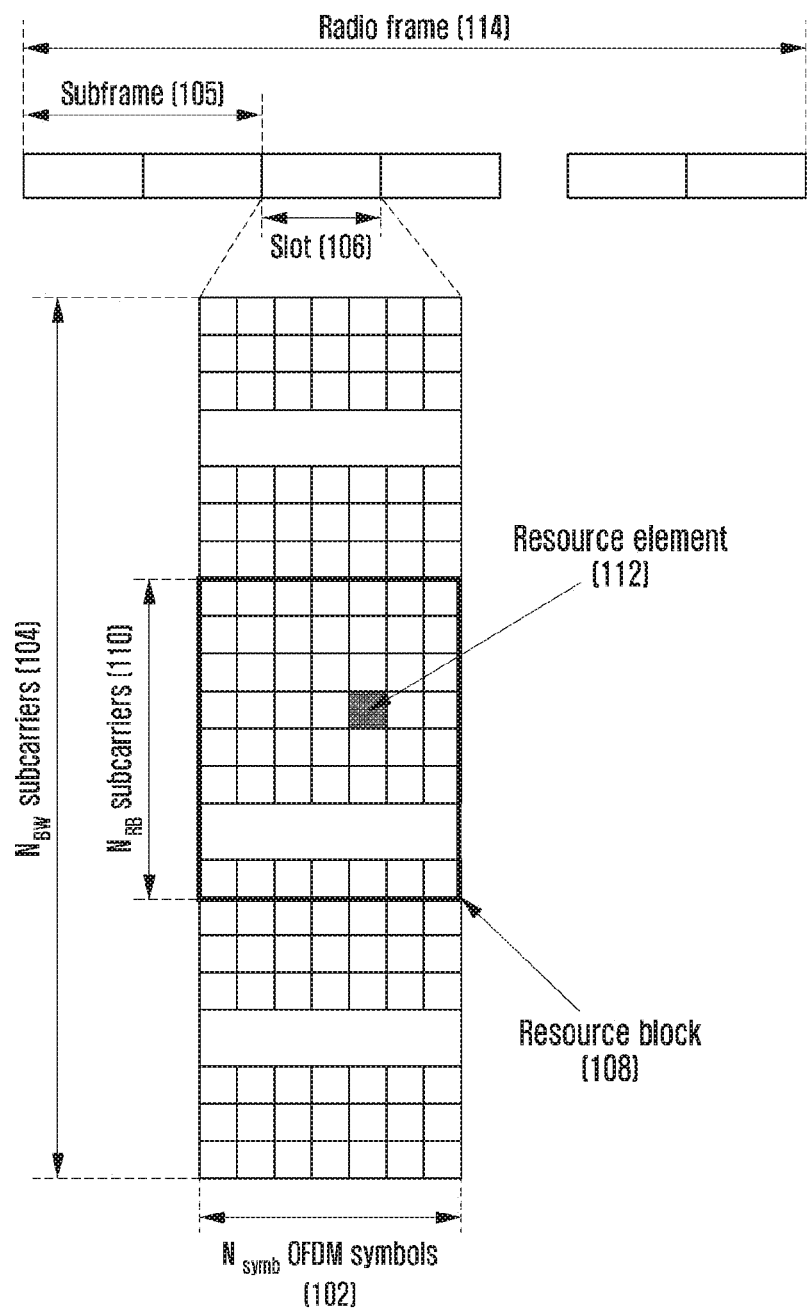
FIG. 1 illustrates a basic structure of a time-frequency region which is a radio resource region in which data or control channels are transmitted in downlink of an LTE system or a system similar thereto.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, in the detailed description of embodiments of the disclosure, an Advanced E-UTRA (or referred to also as LTE-A) system supporting a cooperative communication (CoMP) is mainly discussed. However, the main idea of the disclosure is applicable to other communication systems having similar technical backgrounds or channel types through a small modification without departing from the scope of the disclosure, which can be made by one skilled in the art. For example, the main subject of the disclosure can be applied to multicarrier HSPA supporting carrier aggregation.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

A wireless communication system has developed to be a broadband wireless communication system that provides a high speed and high quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. Also, a communication standard of 5G or new radio (NR) is being developed as a 5G wireless communication system.

As described above, the wireless communication system including $5^{th}$ generation may provide at least one service of enhanced mobile broadband (eMBB), massive machine type communications (mMTC), and ultra-reliable and low-latency communications (URLLC) to a terminal. At this time, the services may be provided to the same terminal during the same time interval.

In all embodiments of the disclosure below, eMBB may be a service aiming at high speed transmission of high capacity data, mMTC may be a service aiming at minimization of terminal power and access of a plurality of terminals, and URLLC may be a service aiming at high reliability and low latency, but are not limited thereto.

In all embodiments of the disclosure below, it may be assumed that a URLLC service transmission time is shorter than eMBB and mMTC service transmission time, but is not limited thereto. The three services may be main scenarios in an LTE system or a system such as 5G/new radio or next radio (NR) after LTE.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station (BS) is the entity that configures some or all of control information of the terminal and allocates resources, and may be one of an eNode B, a Node B, a base station (BS), a radio access unit, a base station controller, transmission and reception point (TRP), or a node on a network. The terminal may include a user equipment (UE), a mobile station (MS), a cellular phone, a smart phone, a computer, or a multimedia system capable of performing a communication function.

In the disclosure, downlink (DL) refers to a wireless transmission path of a signal that the BS transmits to the terminal, and uplink (UL) refers to a wireless transmission path of a signal that the UE transmits to the BS. Embodiments of the disclosure are described by way of an example of the LTE or LTE-A system, but the embodiments of the disclosure may be applied to other communication systems having a similar technical background or channel form. For example, 5$^{th}$ generation mobile communication technology (5G, new radio, and NR), developed after LTE-A, may be included therein. In addition, the embodiment of the disclosure may be applied to other communication systems through some modifications without departing from the scope of the disclosure based on the determination of those skilled in the art.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a terminal (or a user equipment (UE) or a mobile station (MS)) transmits data or a control signal to a base station (BS) (or an eNode B), and the downlink is a radio link through which the base station transmits data or a control signal to the terminal. In the multiple access schemes as described above, time-frequency resources for carrying data or control information are allocated and operated in a manner to prevent overlapping of the resources, i.e. to establish the orthogonality, between users, so as to identify data or control information of each user.

When decoding fails at the initial transmission, the LTE system employs hybrid automatic repeat request (HARQ) that retransmits the corresponding data in a physical layer. In the HARQ scheme, when a receiver does not accurately decode data, the receiver transmits information (negative acknowledge: NACK) informing a transmitter of a decoding failure and thus the transmitter may re-transmit the corresponding data on the physical layer. The receiver may combine data retransmitted from the transmitter and previous data, decoding of which fails, whereby data reception performance may increase. Also, when the receiver accurately decodes data, the receiver transmits information (ACK) reporting that decoding is successfully executed, so that the transmitter transmits new data.

FIG. 1 illustrates the basic structure of a time-frequency domain, which is a radio resource region where data or a control channel is transmitted in a downlink of an LTE system.

Referring to FIG. 1, the horizontal axis indicates a time region, and the vertical axis indicates a frequency region. In the time region, the minimum transmission unit is an OFDM symbol. One slot 106 includes N$_{symb}$ OFDM symbols 102, and one subframe 105 includes two slots. The length of one slot is 0.5 ms, and the length of one subframe is 1.0 ms. A radio frame 114 is a time region unit including 10 subframes. The minimum transmission unit in the frequency region is a subcarrier, and the entire system transmission bandwidth consists of a total of N$_{BW}$ subcarriers 104.

In the time-frequency region, the basic resource unit is a resource element (RE) 112, and an RE may be indicated by an OFDM symbol index and a subcarrier index. A resource block (RB) (or physical resource block (PRB)) 108 is defined by N$_{symb}$ consecutive OFDM symbols 102 in the time region and N$_{RB}$ consecutive subcarriers 110 in the frequency region. Therefore, one RB 108 includes N$_{symb}$× N$_{RB}$ REs 112. Generally, the minimum transmission unit of data is an RB. In the LTE system, generally, N$_{symb}$=7 and N$_{RB}$=12. N$_{BW}$ and N$_{RB}$ are proportional to a bandwidth of the system transmission band. The data rate increases in proportion to the number of RBs scheduled to the terminal. The LTE system defines and operates 6 transmission bandwidths. In the case of an FDD system, in which the downlink and the uplink are divided by the frequency, a downlink transmission bandwidth and an uplink transmission bandwidth may be different from each other. A channel bandwidth may indicate an RF bandwidth corresponding to a system transmission bandwidth. [Table 1] provided below indicates a relationship between a system transmission bandwidth and a channel bandwidth defined in the LTE system. For example, when LTE system has a channel bandwidth of 10 MHz, the transmission bandwidth may consist of 50 RBs.

TABLE 1

| | Channel bandwidth BWchannel [MHz] | | | | | |
|---|---|---|---|---|---|---|
| | 1.4 | 3 | 5 | 10 | 15 | 20 |
| Transmission bandwidth configuration N$_{RB}$ | 6 | 15 | 25 | 50 | 75 | 100 |

Downlink control information is transmitted within initial N OFDM symbols within the subframe. Generally, N={1, 2, 3}. Therefore, the value of N may be changed for each subframe based on the amount of control information to be transmitted in the current subframe. The control information may include a control channel transmission interval indicator indicating the number of OFDM symbols via which control information is to be transmitted, scheduling information associated with downlink data or uplink data, a HARQ ACK/NACK signal, or the like.

In the LTE system, scheduling information associated with downlink data or uplink data may be transmitted from a base station to a terminal via downlink control information (DCI). The uplink (UL) is a radio link through which the terminal transmits data or control signals to the BS, and the downlink (DL) is a radio link through which the BS transmits data or control signals to the terminal. The DCI are defined in various formats. A DCI format may be determined and applied for operation based on whether scheduling information is for uplink data (UP grant) or for downlink data (DL grant), whether it is compact DCI of which the control information is small, whether spatial multiplexing using multiple antennas is applied, whether it is used for controlling power, and the like. For example, DCI format 1 corresponding to scheduling control information on downlink data (DL grant) may be configured to include at least the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB) expressed by time and frequency domain resources, and an RBG includes a plurality of RBs and is used as a basic scheduling unit in the type 0 scheme. Type 1 allows allocation of a predetermined RB in an RBG.

Resource block assignment: indicates RBs allocated to data transmission. An expressed resource is determined according to the system bandwidth and resource allocation scheme.

Modulation and coding scheme (MCS): indicates modulation scheme used for data transmission and the size of a transport block which is data to be transmitted.

HARQ process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH which is an uplink control channel.

The DCI is transmitted through a physical downlink control channel (PDCCH) or enhanced PDCCH (EPDCCH), which is a downlink physical control channel, via a channel-coding and modulation process.

In general, the DCI is channel-coded independently for each terminal and then configured and transmitted as an independent PDCCH. In the time region, the PDCCH is mapped and transmitted during the control channel transmission interval. A mapping location of the PDCCH in the frequency region is determined by an identifier (ID) of each terminal, and is propagated to the entire system transmission band.

Downlink data is transmitted through a physical downlink shared channel (PDSCH) which is a physical downlink data channel. The PDSCH is transmitted after the control channel transmission interval, and the detailed mapping location in the frequency region and scheduling information such as the modulation scheme are notified through DCI transmitted through the PDCCH.

Via an MCS of 5 bits in the control information included in the DCI, the BS may notify of the modulation scheme applied to a PDSCH to be transmitted to the terminal, and the size (transport block size (TBS)) of data to be transmitted. The TBS corresponds to the size before channel coding for error correction is applied to the data (TB) to be transmitted by the BS.

The modulation scheme supported by the LTE system includes quadrature phase shift keying (QPSK), 16 quadrature amplitude modulation (16 QAM), and 64 QAM. Modulation orders (Qm) correspond to 2, 4, and 6 respectively. That is, in the case of the QPSK modulation, 2 bits are transmitted per symbol. In the case of the 16 QAM modulation, 4 bits are transmitted per symbol. In the case of 64 QAM modulation, 6 bits are transmitted per symbol.

Compared to LTE Rel-8, 3GPP LTE Rel-10 adopted a bandwidth extension technology in order to support a larger amount of data transmission. The technology called bandwidth extension or carrier aggregation (CA) may expand the band and thus increase an amount of data transmission by the expanded band compared to the TLE Rel-8 terminal which transmits data in one band. Each of the bands is called a component carrier (CC), and the LTE Rel-8 terminal is defined to have one component carrier for each of the downlink and the uplink. Further, a group of uplink component carriers connected to downlink component carriers through SIB-2 is called a cell. An SIB-2 connection relation between the downlink component carriers and the uplink component carriers is transmitted through a system signal or a higher layer signal. The terminal supporting CA may receive downlink data through a plurality of serving cells and transmit uplink data.

In LTE Rel-10, when the BS has difficulty in transmitting a physical downlink control channel (PDCCH) to a particular terminal in a particular serving cell, the BS may transmit the PDCCH in another serving cell and configure a carrier indicator field (CIF) as a field indicating that the corresponding PDCCH is a physical downlink shared channel (PDSCH) or a physical uplink shared channel (PUSCH) of the other serving cell. The CIF may be configured in the terminal supporting CA. The CIF is determined to indicate another serving cell by adding 3 bits to the PDCCH in a particular serving cell, and the CIF is included only when cross carrier scheduling is performed and, if the CIF is not included, the cross carrier scheduling is not performed. When the CIF is included in downlink allocation information (DL assignment), the CIF is defined to indicate a serving cell to which a PDSCH scheduled by the DL assignment is transmitted. When the CIF is included in uplink resource allocation information (UL grant), the CIF is defined to indicate a serving cell to which a PUSCH scheduled by the UL grant is transmitted.

As described above, carrier aggregation (CA) which is a bandwidth expansion technology is defined and thus a plurality of serving cells may be configured in the terminal in LTE Rel-10. The terminal periodically or aperiodically transmits channel information of the plurality of serving cells to the BS for data scheduling of the BS. The BS schedules and transmits data for each carrier and the terminal transmits A/N feedback of data transmitted for each carrier. LTE Rel-10 is designed to transmit A/N feedback which is a maximum of 21 bits and, when transmission of A/N feedback and transmission of channel information overlap in one subframe, designed to transmit the A/N feedback and discard the channel information. LTE Rel-11 is designed to multiplex A/N feedback and channel information of one cell and transmit the A/N feedback corresponding to a maximum of 22 bits and the channel information of one cell in transmission resources of PUCCH format 3 through PUCCH format 3.

In LTE Rel-13, a maximum of 32 serving cell configuration scenarios are assumed. LTE-Rel 13 includes a concept of expanding the number of serving cells up to a maximum of 32 serving cells through not only a licensed band but also an unlicensed band. Further, LTE Rel-13 includes provides of an LTE service in an unlicensed band such as a band of 5 GHz in consideration of limitation on the number of licensed bands such as the LTE frequency, which is called licensed assisted access (LAA). The LAA applies a carrier aggregation technology of LTE to support operation of the LTE cell corresponding to the licensed cell as a primary cell (PCell) and the LAA cell corresponding to the unlicensed band as a secondary cell (SCell). Accordingly, like in LTE, feedback generated in the LAA cell corresponding to the SCell should be transmitted only in the PCell and the LAA cell may freely apply a downlink subframe and an uplink subframe. Unless specially mentioned in this specification, LTE refers to all evolved technologies of LTE such as LTE-A and LAA.

Meanwhile, a new radio access technology (NR) which is a communication system after LTE, that is, a 5yh generation wireless cellular communication system (hereinafter, referred to as 5G in this specification) may freely reflect various requirements of users and service providers and accordingly support services meeting various requirements.

Accordingly, 5G may include various 5G services such as enhanced mobile broadband and (hereinafter, referred to as eMBB in this specification), mass machine type communication (hereinafter, referred to mMTC in this specification), and ultra reliable and low latency communication (hereinafter, referred to as URLLC in this specification). Further, each of the 5G services may be defined as a technology for meeting requirements selected for each 5G service among the requirements such as a maximum transmission speed of the terminal corresponding to 20 Gbps, a maximum speed of the terminal corresponding to 500 km/h, a maximum delay time corresponding to 0.5 ms, and terminal access density corresponding to 1,000,000 terminals/km$^2$.

For example, in order to provide eMBB in 5G, a maximum transmission speed of the terminal corresponding to 20 Gbps may be provided in downlink and a maximum transmission speed of the terminal corresponding to 10 Gbps may be provided in uplink from a viewpoint of one BS. Also, an average transmission speed which can be actually felt through the terminal should be increased. In order to satisfy such requirements, improvement of transmission/reception technologies, including a further improved multi-input multi-output transmission technology, is needed.

Also, in order to support an application service such as the Internet of Things (IoT), mMTC is considered in 5G. The mMTC has requirements to support access of massive terminals within a cell, improve coverage of the terminal, increase a battery lifetime, and reduce the costs of the terminal in order to efficiently provide IoT. IoT is attached to various sensors and devices to provide a communication function, and thus should support a large number of terminals (for example, 1,000,000 terminals/km$^2$) within the cell. Further, in the mMTC, the terminal is highly likely to be located in a shade area such as a basement of a building or an area which cannot be covered by the cell due to characteristics of the service, so that the mMTC requires the wider coverage than the coverage provided by the eMBB. The mMTC is highly likely to be configured by a cheap terminal and it is difficult to frequently change a battery of the terminal, so that a long battery lifetime is needed.

Last, the URLLC is cellular-based wireless communication used for a particular purpose and corresponds to a service used for remote control of a robot or a machine device, industrial automation, unmanned aerial vehicle, remote health control, and emergency notification. Accordingly, the URLLC should offer communication providing ultra-low latency and ultra-low reliability. For example, the URLLC should meet a maximum delay time shorter than 0.5 ms and also has requirements to provide a packet error rate equal to or lower than $10^{-5}$. Therefore, for the URLLC, a transmit time interval (TTI) smaller than that of the 5G service such as the eMBB should be provided and also it is required to design allocation of wide resources in a frequency band.

The services considered in the 5$^{th}$ generation wireless cellular communication system should be provided as a single framework. That is, in order to efficiently manage and control resources, it is preferable to perform control and transmission such that the services are integrated into one system rather than to independently operate the services.

Figure 2:
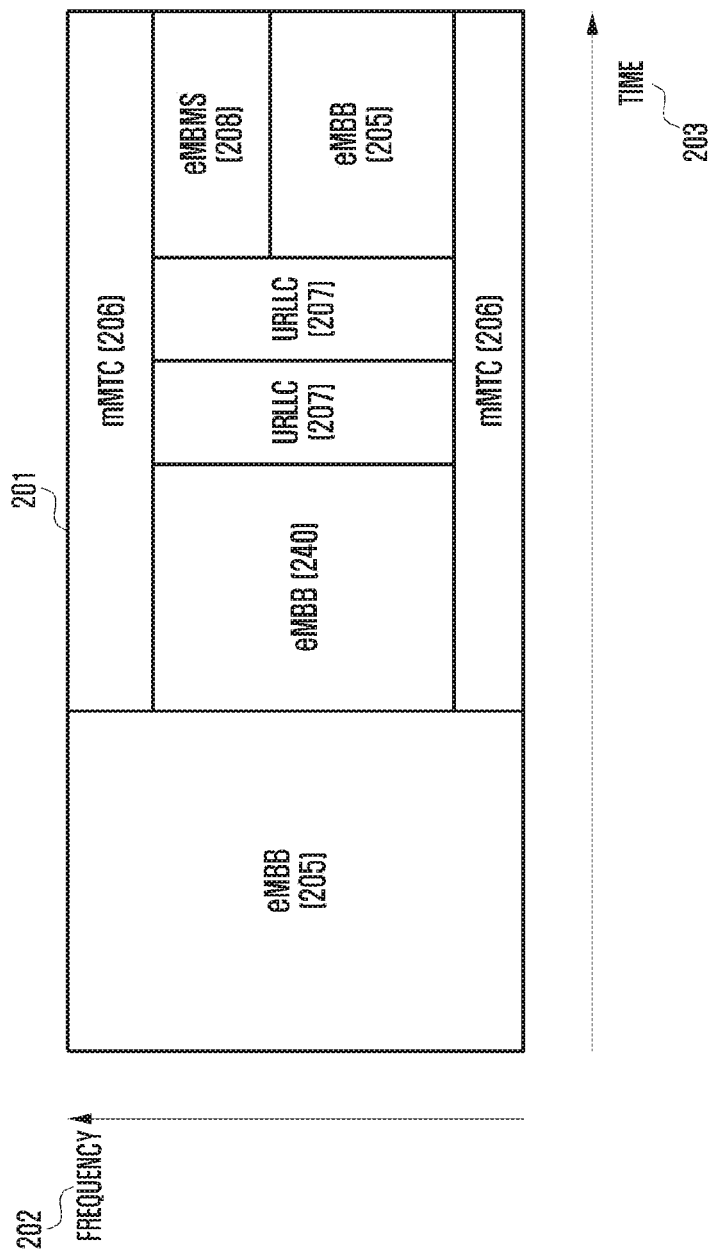
FIG. 2 illustrates an example in which services considered in 5G are multiplexed to one system.

FIG. 2 illustrates an example in which services considered in 5G are multiplexed to one system.

In FIG. 2, frequency-time resources 201 used in 5G may include a frequency axis 202 and a time axis 203. FIG. 2 illustrates an example in which eMBB 205, mMTC 206, and URLLC 207 are operated within one framework of 5G by a 5G BS. Further, as a service which can be additionally considered by 5G, an enhanced mobile broadcast/multicast service (eMBMS) 208 for providing a cellular-based broadcast service may be considered. The services considered by 5G, such as the eMBB 205, the mMTC 206, the URLLC 207, and the eMBMS 208 may be multiplexed through time division multiplexing (TDM) or frequency division multiplexing (FDM) within one system frequency bandwidth operated by 5G, and spatial division multiplexing may be also considered. In the case of the eMBB 205, it is preferable to occupy and transmit a maximum of frequency bandwidths for a particular time in order to provide the increased data transmission rate. Accordingly, it is preferable that the service of the eMBB 205 is time division-multiplexed with another service within a system transmission bandwidth 201, but it is also preferable that the service of the eMBB 205 is frequency division-multiplexed with other services within the system transmission bandwidth according to a need of the other services.

Unlike other services, the mMTC 206 requires an increased transmission interval to secure wider coverage and may secure the coverage by repeatedly transmitting the same packet within the transmission interval. In order to simultaneously reduce terminal complexity and terminal price, a transmission bandwidth in which the terminal can perform reception is limited. As described above, when the requirements are considered, it is preferable that the mMTC 206 is frequency division multiplexed with other services within the transmission system bandwidth 201.

It is preferable that the URLLC 207 has a shorter transmit time interval (TTI) compared to other services in order to meet ultra-low latency requirements required by the service. Also, in order to meet ultra-reliable requirements, a low coding rate is needed, so that it is preferable to have a wide bandwidth on the light of the frequency. When the requirements of the URLLC 207 are considered, it is preferable that the URLLC 207 is time division multiplexed with other services within the transmission system bandwidth 201 of 5G.

The aforementioned services may have different transmission/reception schemes and transmission/reception parameters in order to meet requirements required by the services. For example, the services may have different numerologies according to the requirements thereof. The numerology includes a cyclic prefix (CP) length, subcarrier spacing, an OFDM symbol length, and a transmission interval length (TTI) in an orthogonal frequency division multiplexing (OFDM) or an orthogonal frequency division multiple access (OFDMA)-based communication system. In an example in which the services have different numerologies, the eMBMS 208 may have a longer CP than other services. The eMBMS 208 may transmit broadcasting-based higher traffic and thus transmit the same data in all cells. At this time, if signals received by a plurality of cells reach within the CP length, the terminal may receive and decode all of the signals and thus obtain a single frequency network (SFN) diversity gain, and accordingly, even a terminal located on a cell boundary can receive broadcasting information without any coverage restriction. However, when the CP length is relatively longer compared to other services, waste occurs due to CP overhead in order to support the eMBMS and thus a longer OFDM symbol is required compared to other service, which results in narrower subcarrier spacing compared to other services.

Further, as an example in which different numerologies are used for services in 5G, a shorter OFDM symbol may be required as a shorter TTI is needed compared to other services and also wider subcarrier spacing may be required in the case of URLLC.

In the above description, the need of various services to meet various requirements of 5G has been described and requirements of services which are representatively considered have been described.

Frequencies in which 5G will operate range from several GHz to scores of GHz, and frequency division duplex (FDD)

is preferred rather than time division duplex (TDD) in a band of several GHz which corresponds to a low frequency and TDD is preferred rather than FDD in a band of scores of GHz which corresponds to a high frequency. However, unlike FDD in which a separate frequency is reserved for uplink and downlink transmission and uplink and downlink transmission resources are continuously provided, TDD supports both the uplink and downlink transmission in one frequency and supports only one of the uplink and downlink resources according to the time. If it is assumed that URLLC uplink transmission or downlink transmission is needed in TDD, it is difficult to meet ultra-low latency requirements required by URLLC due to a delay up to the time at which uplink or downlink resources appear. Accordingly, in the case of TDD, a need of a method of dynamically change a subframe to a subframe for uplink or downlink according to whether data of URLLC corresponds to uplink or downlink arises in order to meet the ultra-low latency requirements of URLLC.

Meanwhile, even when services and technologies for 5G phase 2 or beyond 5G are multiplexed to the 5G operation frequency in 5G in the future, there are requirements to provide technologies and service of 5G phase 2 or beyond 5G so that no problem occurs about backward compatibility in operation of the previous 5G technologies. The requirement is referred to as forward compatibility and techniques for satisfying the forward compatibility should be considered when initial 5G is designed. In the initial LTE standardization step, consideration of forward compatibility was inadequate, so that there may be a limitation on providing a new service within an LTE framework. For example, in the case of enhanced machine type communication (eMTC) applied to LTE release-13, the terminal is able to communicate only in a frequency corresponding to 1.4 MHz regardless of a system bandwidth provided by a serving cell. Accordingly, complexity of the terminal is reduced and price of the terminal is lowered. Meanwhile, since the terminal supporting eMTC cannot receive a physical downlink control channel (PDCCH) transmitted in the whole band of the conventional system transmission bandwidth, there is a limitation in that a signal cannot be received in a time interval in which the PDCCH is transmitted. Accordingly, the 5G communication system should be designed to efficiently coexist with services considered after the 5G communication system. For forward compatibility in the 5G communication system, resources should be freely allocated and transmitted so that services considered in the future can be freely transmitted in a time-frequency resource region supported by the 5G communication system. Accordingly, a need of a method of freely allocating time-frequency resources arises in the 5G communication system to support forward compatibility.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, although the following detailed description of embodiments of the disclosure will be directed to LTE and 5G systems, it can be understood by those skilled in the art that the main gist of the disclosure may also be applied to any other communication system having similar technical backgrounds and channel formats, with a slight modification, without substantially departing from the scope of the disclosure.

Hereinafter, a 5G communication system in which 5G cells operate in a stand-alone type or a 5G communication system in which 5G cells operate in a non-alone type through a combination of dual connectivity or carrier aggregation with other stand-alone 5G cells will be described.

FIGS. 3A, 3B, 4A, and 4B illustrate embodiments of a communication system to which the disclosure is applied. Schemes proposed by the disclosure can be applied all of the systems in FIGS. 3A, 3B, 4A, and 4B.

Figure 3A:
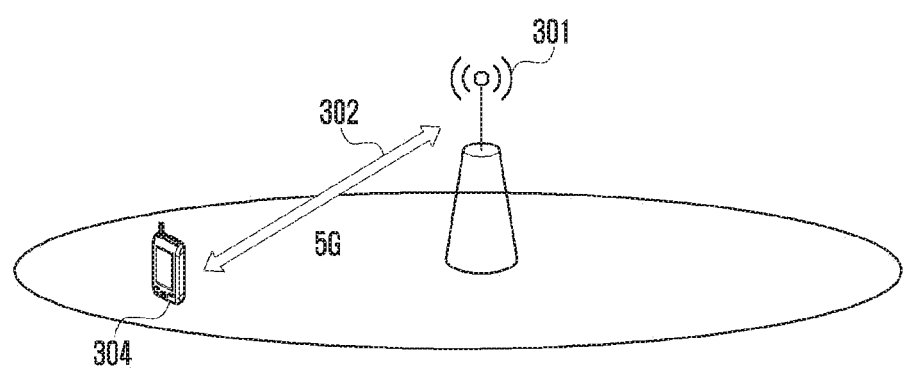
FIGS. 3A, 3B, 4A, and 4B illustrate embodiments of a communication system to which the disclosure is applied.

FIG. 3A illustrates the case in which a 5G cell 302 operate in a stand-alone type within one BS 301 over a network. A terminal 304 is a 5G capable terminal having a 5G transmission/reception module. The terminal 304 acquires synchronization through a synchronization signal transmitted from the stand-alone BS 301 and, after receiving system information, attempts random access to the 5G BS 301. The terminal 304 transmits and receives data through the 5G cell 302 after RRC connection with the 5G BS 301 is completed. In this case, there is no limitation on a duplex method of the 5G cell 302. The 5G cell may have a plurality of serving cells in the system of FIG. 3A.

Figure 3B:
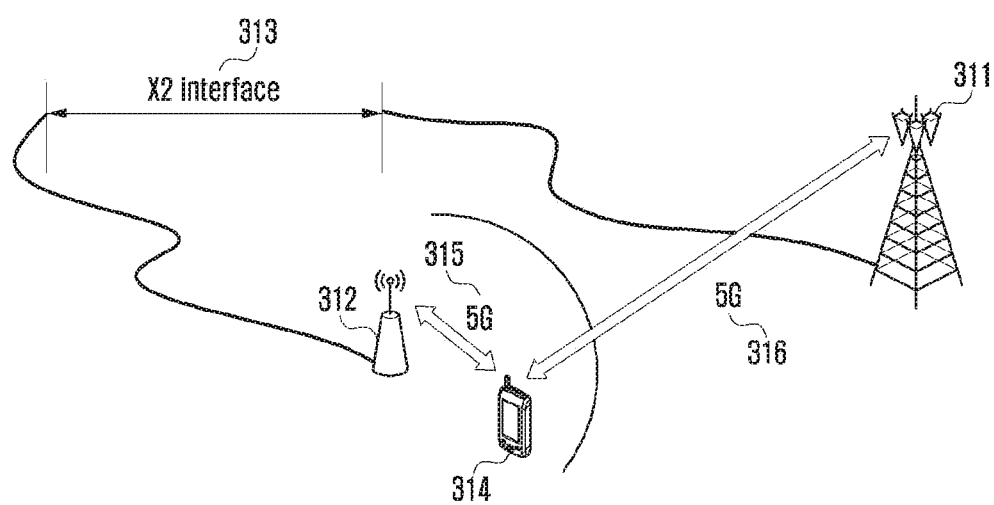

FIG. 3B includes a 5G stand-alone BS 311 and a 5G non-stand-alone BS 312 for an increase in an amount of data transmission. A terminal 314 is a 5G capable terminal having a 5G transmission/reception module for performing 5G communication. The terminal 314 acquires synchronization through a synchronization signal transmitted from the stand-alone BS 311 and, after receiving system information, attempts random access to the 5G stand-alone BS 311. After RRC connection with the 5G stand-alone BS 311 is completed, the terminal 314 additionally configures a 5G non-stand-alone cell 315 and transmits/receives data through the 5G stand-alone BS 311 or the 5G non-stand-alone BS 312. In this case, it is assumed that there is no limitation on the duplex method of the 5G stand-alone BS 311 or the 5G non-stand-alone BS 312 and the 5G stand-alone BS 311 and the 5G non-stand-alone BS 312 are connected through an ideal backhaul network or a nonideal backhaul network. In the case of the nonideal backhaul network, rapid X2 communication 313 between BSs is possible. In the system of FIG. 3B, the 5G cell may have a plurality of serving cells.

Figure 4A:
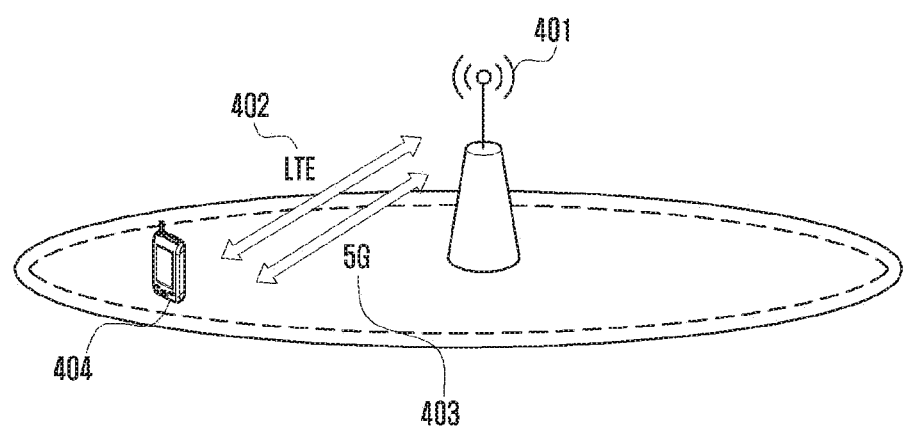

FIG. 4A illustrates the case in which an LTE cell 402 and a 5G cell 403 coexist within one BS 401 over a network. A terminal 404 may be an LTE capable terminal having an LTE transmission/reception module, a 5G capable terminal having a 5G transmission/reception module, or a terminal having both the LTE transmission/reception module and the 5G transmission/reception module. The terminal 404 acquires synchronization through a synchronization signal transmitted from the LTE cell 402 or the 5G cell 403 and, after receiving system information, transmits and receives data to and from the BS 401 through the LTE cell 402 or the 5G cell 403. In this case, there is no limitation on a duplex method of the LTE cell 402 or the 5G cell 403. Uplink control transmission is performed through the LTE cell 402 when the LTE cell is a PCell and is performed through the 5G cell 403 when the 5G cell is a PCell. In the system of FIG. 4A, the LTE cell 402 and the 5G cell 403 may have a plurality of serving cells and support a total of 32 serving cells. It is assumed that the BS 401 includes both an LTE transmission/reception module (system) and a 5G transmission/reception module (system) over the network, and the BS 401 can manage and operate the LTE system and the 5G system in real time. If the LTE system and the 5G system are operated on different time resources, allocation of time resources of the LTE system and the 5G system can be dynamically selected. The terminal 404 may receive, from the LTE cell 402 or the 5G cell 403, a signal indicating allocation of resources (time resources, frequency resources, antenna resources, or spatial resources) separately operated for the LTE cell and the 5G cell, thereby recognizing the resources through which data is received from the LTE cell 402 and the 5G cell 403.

Figure 4B:
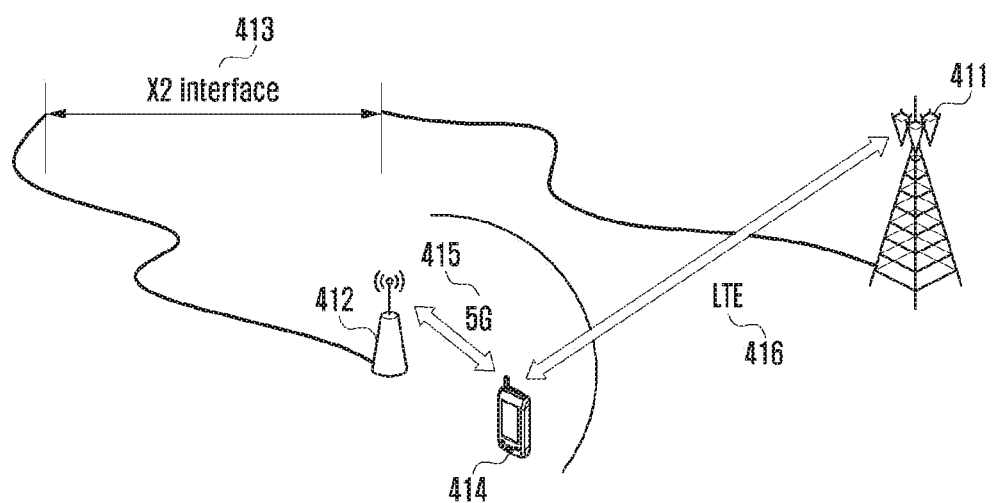

FIG. 4B illustrates installation of an LTE macro BS 411 for wide coverage and a 5G small BS 412 for an increase in an amount of data transmission over the network. A terminal 414 may be an LTE capable terminal having an LTE transmission/reception module, a 5G capable terminal having a 5G transmission/reception module, or a terminal having both the LTE transmission/reception module and the 5G transmission/reception module. The terminal 414 acquires synchronization through a synchronization signal transmitted from an LTE BS 411 or a 5G BS 412 and, after receiving system information, transmits and receives data through the LTE BS 411 and the 5G BS 412. In this case, there is no limitation on a duplex method of the LTE macro BS 411 or the 5G small BS 412. Uplink control transmission is performed through the LTE cell 416 when the LTE cell is a PCell and is performed through the 5G cell 415 when the 5G cell is a PCell. At this time, it is assumed that the LTE BS 411 and the 5G BS 412 have an ideal backhaul network or a nonideal backhaul network. In the case of the nonideal backhaul network, rapid X2 communication 413 between BSs is possible. That is, even though uplink transmission is performed only to the LTE BS 411, the 5G BS 412 can receive relevant control information from the LTE BS 411 in real time through the X2 communication 413. In the system of FIG. 4B, the LTE cell and the 5G cell may include a plurality of serving cells and support a total of 32 serving cells. The BS 411 or 412 can manage and operate the LTE system and the 5G system in real time. If the BS 411 operates the LTE system and the 5G system on different time resources, the BS 411 can dynamically select allocation of time resources of the LTE system and the 5G system and transmit a signal thereof to another BS through X2 communication. The terminal 414 may receive, from the LTE cell 411 or the 5G BS 412, a signal indicating allocation of resources (time resources, frequency resources, antenna resources, or spatial resources) separately operated for the LTE cell and the 5G cell, thereby recognizing the resources through which data is transmitted and received to and from the LTE cell 416 and the 5G cell 415.

Meanwhile, when the LTE BS 411 and the 5G BS 412 have the nonideal backhaul network, rapid X2 communication 413 between the BSs is possible. Accordingly, the BS 411 or 412 can semi-statically operate the LTE system and the 5G system. For example, when the BS 411 operates the LTE system and the 5G system on different time resources, the BS 411 can select allocation of time resources of the LTE system and the 5G system and transmit in advance a signal thereof to the other BS 412 through X2 communication, thereby separating the resources of the LTE system and the 5G system. The terminal 414 may receive, from the LTE cell 411 or the 5G BS 412, a signal indicating allocation of resources (time resources, frequency resources, antenna resources, or spatial resources) separately operated for the LTE cell and the 5G cell, thereby recognizing the resources through which data is transmitted and received to and from the LTE cell 416 and the 5G cell 415.

Terms "physical channel" and "signal" in the conventional LTE or LTE-A system may be used to describe the method and the apparatus proposed by embodiments. However, embodiments of the disclosure can be applied to a wireless communication system rather than the LTE and LTE-A systems.

Further, the technology proposed by the disclosure can be applied to a new type duplex mode (for example, LTE frame structure type 3) as well as the FDD and TDD systems. Hereinafter, higher layer signaling or higher layer signal in the disclosure refers to a method by which the BS delivers a signal to the terminal through a downlink data channel of a physical layer or by which the terminal delivers a signal to the BS through an uplink data channel of a physical layer, and is transferred between the BS and the terminal through at least one method of RRC signaling, PDCP signaling, or a MAC control element (MAC CE).

Figure 5:
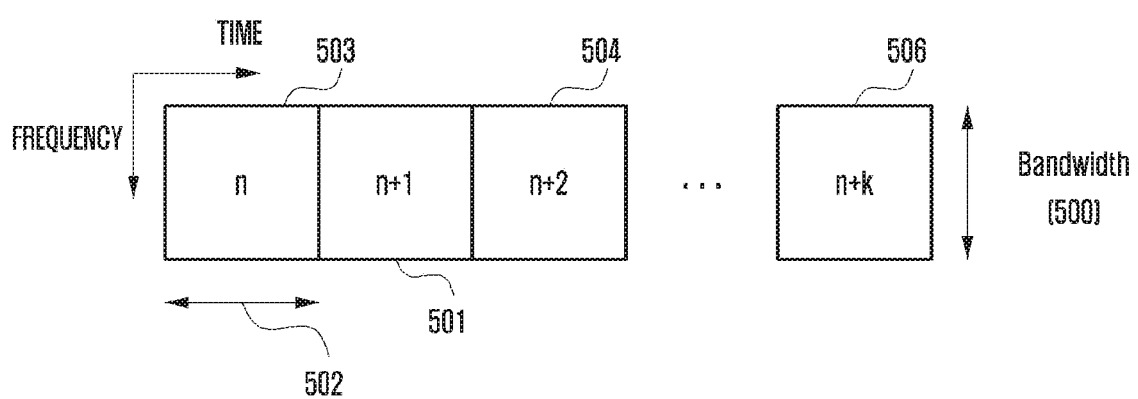
FIG. 5 illustrates the situation to be resolved by the disclosure.

FIG. 5 illustrates the situation to be resolved by the disclosure. A network or a BS (hereinafter, referred to as a BS) transmits scheduling information for uplink data transmission to the terminal through a downlink control channel. The terminal receiving uplink scheduling configuration information transmitted through the downlink control channel transmits uplink data to the BS according to the received uplink scheduling configuration information. At this time, the BS may configure the terminal to perform uplink data transmission in one or more uplink transmission slots through the uplink scheduling configuration information. In the example of FIG. 5, the BS may configure the number of slots (for example, a value of one of slots 1 to k) for the uplink data transmission through one field of the uplink scheduling configuration information transmitted for configuring uplink transmission by the terminal. The terminal may transmit uplink data through the configured slots (from slot n 503 to slot n+k 506). At this time, scheduling uplink transmission in one or more slots through one uplink scheduling configuration information is called slot aggregation.

Further, the BS may request transmitting uplink control information on a downlink control channel. In other word, the BS may transmit the request for transmitting uplink control information and uplink scheduling information for transmitting the control information to the terminal through the downlink control channel. The terminal receiving the request for transmitting the uplink control information and the uplink scheduling configuration information transmitted through the downlink control channel transmits the requested uplink control information (UCI) to the BS through frequency and time resources in which transmission is configured according to the received uplink scheduling configuration information.

At this time, the uplink control information (UCI) includes a reception result or HARQ-ACK/NACK information for a downlink data channel and channel information (channel state information (CSI)) for one or more channels. At this time, the CSI information may collectively express information related to a channel and a direction of transmission beams required for efficiency signal transmission/ reception such as channel quality information (CQI), precoding information (PMI), rank information (RI), and beam information. In the disclosure, for convenience of description, the HARQ information may be divided into and referred to as first type UCI information, first type UCI information, or first type uplink control information, CQI and PMI may be divided into and referred to as second type UCI information, second UCI information, or second type uplink control information, and RI and beam-related information may be divided into and referred to as third type UCI information, third type UCI information, or third type uplink control information. At this time, the division of UCI information is only one example for expressing the method proposed by the disclosure, and the disclosure is not limited to the division of UCI information. For example, the CQI and PMI or the RI and beam-related information maybe expressed as different types of UCI information, or at least one UCI information among the second type or third type UCI information may be included in different types of UCI. For example, the beam-related information may be classified as the second type UCI along with the CQI and PMI. Further, among the UCI information, at least the second type uplink control information and the third type uplink control information may be expressed as CSI information.

The BS may request transmitting uplink control information through one downlink control channel and transmit scheduling information for transmitting uplink data to the terminal. In other word, the BS may request transmitting uplink control information through the downlink control channel and transmit uplink scheduling information for transmitting the uplink control information and uplink data information to the terminal. The terminal receiving the request for transmitting the uplink control information and the uplink scheduling configuration information transmitted through the downlink control channel transmits the requested uplink control information (UCI) to the BS according to the received uplink scheduling configuration information. A more detailed method by which the terminal transmits uplink control information and data will be described below again.

The terminal may identify whether the uplink transmission configured by the BS is a configuration for uplink data transmission, a request for uplink control information, or uplink data transmission and uplink control information request through one or more configuration values in the received uplink scheduling information. For example, the terminal may determine whether there is a request for transmitting uplink control information through a value of a field making the request for transmitting uplink control information in the uplink scheduling information. In another example, when an allocation value of uplink frequency resources is configured as a predefined particular value (a number of particular RBs or a frequency region) or when an information value of the MCS used for uplink transmission is configured as a predefined particular MCS value (for example, a first or last MCS value) in the uplink scheduling information, the terminal may determine whether the uplink scheduling information is about transmission of uplink data or whether the request for transmitting uplink control information is made without transmission of uplink data by the BS. At this time, through values configured in one or more fields of values of the frequency resource allocation information, the MCS information, redundancy version (RV) information, and new data indicator (NDI) information, the terminal may determine whether the configured uplink transmission is transmission of uplink data.

The BS may request transmitting uplink control information through one downlink control channel and transmit scheduling information for transmitting uplink data to the terminal. In other word, the BS may request transmitting uplink control information through the downlink control channel and transmit uplink scheduling information for transmitting the uplink control information and uplink data information to the terminal. The terminal receiving the request for transmitting the uplink control information and the uplink scheduling configuration information transmitted through the downlink control channel transmits the requested uplink control information (UCI) to the BS according to the received uplink scheduling configuration information. At this time, a method by which the terminal transmits the uplink control information and data is described with reference to FIGS. 6 and 7.

Figure 6:
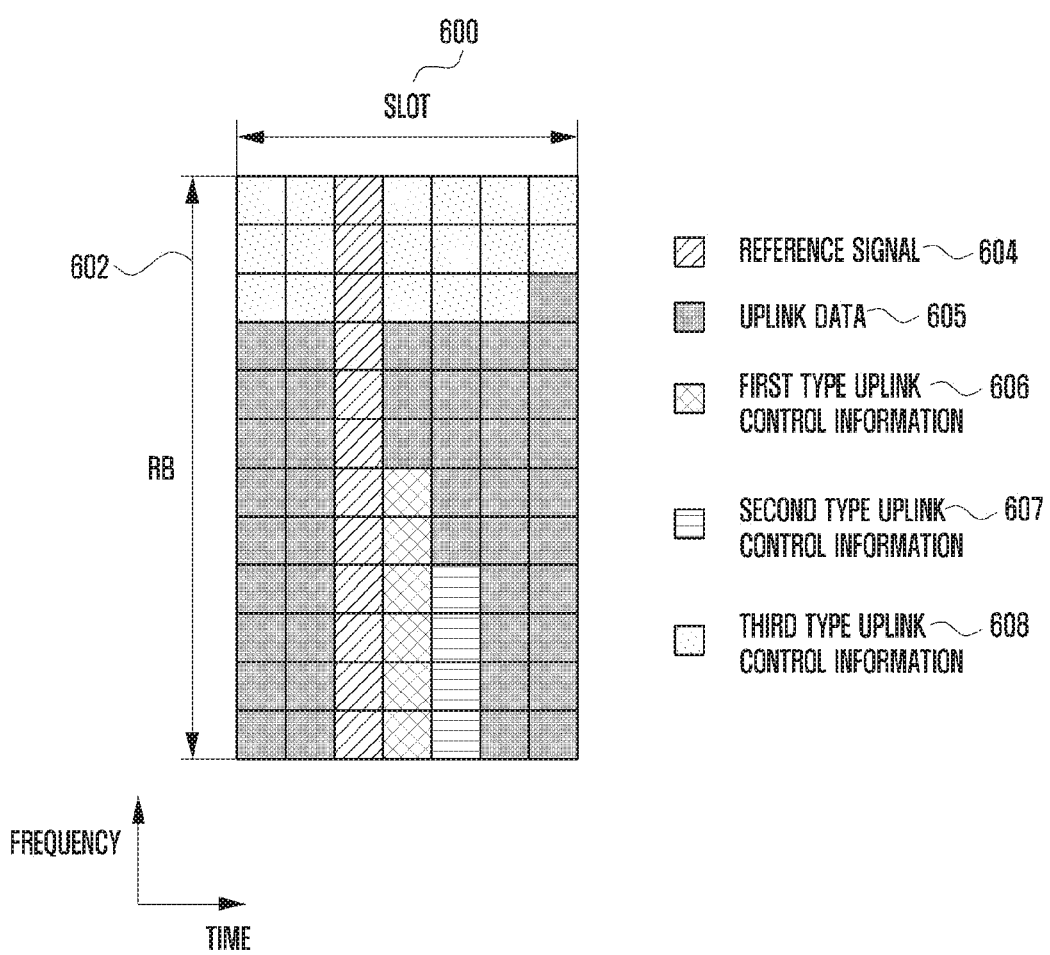
FIGS. 6 and 7 illustrate an example for a method proposed by the disclosure.

FIG. 6 illustrates a method by which the terminal transmits uplink control information and uplink data in one uplink transmission slot. For convenience of description, it is assumed that uplink control information and uplink data are transmitted in one RB 602 and one slot interval 600 in FIG. 6. At this time, it is assumed that reference signals 604 used when the BS receives the data and control information and used for decoding signals received from the BS are transmitted in one system. A method of transmitting the reference signals or a transmission structure is only one example, and a method of transmitting uplink control information and uplink data proposed by the disclosure can be applied regardless of the structure of reference signals. Further, the method of transmitting uplink control information and uplink data proposed by the disclosure can be applied to not only transmission of uplink control information and uplink data using one or more RBs and one or more slots but also transmission of the reference signals 604 in one or more symbols in one slot. Further, although it is assumed that first type uplink control information 606, second type uplink control information 607, and third type uplink control information 608 and data 605 are transmitted in one RB and one slot in FIG. 6, the method proposed by the disclosure can be applied to the case in which at least one piece of the control information is not transmitted.

As illustrated in FIG. 6, the first type uplink control information 606, the second type uplink control information 607, and the third type uplink control information 608 and data 605 may be transmitted in one RB and one slot. Among the control information, the first type uplink control information including information which the BS should receive with higher reliability, for example, HARQ-ACK/NACK information may be transmitted through a symbol closest to the reference signal 604 in the transmission slot 600, for example, a symbol before or after the system in which the reference signal 604 is transmitted. In other words, it is possible to increase reliability of transmission of information which is more important to the system operation among the uplink control information by performing a configuration such that the first type uplink control information 606 is transmitted in a symbol having the highest channel performance estimated through the reference signal 604 and the second type uplink control information 607 (for example, RI) is transmitted in a system before or after the first type uplink control information. REs in which the first type uplink control information 606 or the first type uplink control information 606 and the second type uplink control information 607 are transmitted may be transmitted by puncturing REs of the uplink data 605 transmitted in the transmission slot 600. Alternatively, the uplink data 605 may be transmitted through rate-matching or multiplexing with REs in which the second type uplink control information 607 or the first type uplink control information 606 and the second type uplink control information 607 are transmitted. The first type uplink control information 606 can be transmitted by puncturing REs in which the uplink data 605 is transmitted, and the uplink data 605 can be transmitted through multiplexing or rate-matching with the second type uplink control information 607. When the terminal transmits the first type uplink control information 606, the second type uplink control information 607, and the data 605, the first type uplink control information 606 may be transmitted through puncturing of the uplink data 605. In this case, the terminal may map the reference signals 604 to predefined reference signal transmission symbols or REs in the slot for transmitting the first type uplink control information 606 and the data 605 and map the second type uplink control information 607 to symbols or REs for transmitting the predefined second type uplink control information. Thereafter, the terminal maps the uplink data 605 to the remaining valid REs other than the symbols or REs to which the reference signal 604 and the second type uplink control information 607 are mapped among the uplink frequency and time resource region or the REs received from the BS. Subsequently, the terminal may puncture the REs for transmitting the predefined first type uplink control information, for example, the mapped uplink data REs at the location of the symbol before or after the reference signals 604 and transmit the first type uplink control information 606. When the terminal transmits the first type uplink control information 606, the second type uplink control information 607, and the data, the uplink data 605 may be transmitted through multiplexing or rate-matching with the first type uplink control information 606 and the second type uplink control information 607. The terminal maps the reference signals 604 to predefined reference signal transmission symbols or REs in the slot for transmitting uplink control information and maps the first type uplink control information 606 and the second type uplink control information 607 to symbols or REs for transmitting the predefined first type uplink control information and second type uplink control information. Thereafter, the terminal maps the uplink data 605 to the remaining valid REs other than the symbols or REs to which the reference signals 604, the first type uplink control information 606, and the second type uplink control information 607 are mapped among the uplink frequency and time resource region or the REs received from the BS.

If control information (hereinafter, referred to as third control information) such as CQI and PMI having different sizes of transmission information that are larger than other uplink control information should be transmitted through the uplink control information, the third type uplink control information 608 may be transmitted with the uplink data 605 in the way different from that of the first type uplink control information 606 and the second uplink control information 607.

Figure 7:
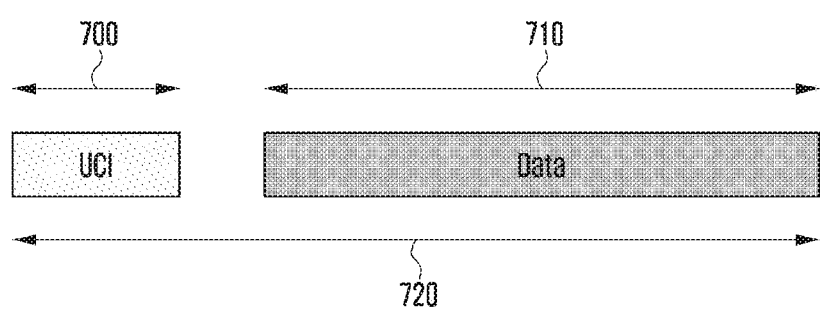

FIG. 7 illustrates a method by which the terminal multiplexes some uplink control information (for example, the third type uplink control information) and uplink data. The terminal may concatenate third type uplink control information 700 the third type uplink control information 700 before or after uplink data 710 of which transmission is configured and determine the total size 720 of the configured uplink transmission signal. The terminal may map and transmit the control information and the data signal according to uplink scheduling information (for example, time and frequency resource allocation information) configured by the BS based on a predefined rule based on the size of the third uplink control information 700 and the signal of the data 710.

Through uplink scheduling configuration information, the BS may configure a particular terminal to transmit uplink data through one or more uplink transmission slots, in other words, uplink slot aggregation. At this time, slot aggregation can be supported by only some terminals implementing the function according to capability of the terminal, and whether the slot aggregation can be performed may be included in capability information which the terminal transmits to the BS. At this time, supporting slot aggregation by the terminal may include not only information on whether downlink slot aggregation and uplink slot aggregation are supported or not but also the maximum number of slots belonging to supportable downlink slot aggregation and uplink slot aggregation. Whether to support downlink slot aggregation, whether to support uplink slot aggregation, and the number of slots belonging to supportable downlink slot aggregation and uplink slot aggregation may vary depending on the terminal or the downlink and uplink slot aggregation. If the terminal is a terminal supporting uplink slot aggregation, the BS may inform the terminal of the maximum size or number (N) of slots which can be aggregated through an RRC signal. At this time, the maximum number of uplink slots which can be aggregated may be 1 which means that slot aggregation is not performed or may be an integer from N larger than 1 (for example, 2) to N. The maximum number of uplink slots which can be aggregated, which the BS configures in the terminal through the RRC signal, is a value indicating a maximum value. That is, the BS may inform the terminal of the number of uplink slots actually used for transmitting uplink control information or data through uplink scheduling information. At this time, the number of uplink slots actually used for transmitting uplink control information or data may include 1 and may be equal to or smaller than the maximum value configured through the higher layer signal. Hereinafter, it is assumed that the BS and the terminal support aggregation of one or more uplink slots, in other words, from 1 uplink slot to a maximum of N uplink slots in the disclosure. Further, in the disclosure, uplink control information and CSI information are interchangeably used, but meanings thereof can be inferred in context. For example, uplink control information refers to at least one piece of control information among first type uplink control information, second type uplink control information, and third type uplink control information, and CSI information refers to at least one piece of control information among second type uplink control information and third type uplink control information. Hereinafter, various embodiments proposed by the disclosure include the case in which the BS schedules uplink data transmission of the terminal through one or more uplink transmission slots and also requests transmitting uplink control information or CSI information to the terminal. The methods proposed by the disclosure can be applied to the case in which the BS requests uplink control information or CSI information through one or more uplink transmission slots to the terminal without transmitting uplink scheduling information to the terminal. Further, the size of uplink control information for each type or the size of all uplink control information described below in the disclosure may be determined through the number of symbols in which uplink control information for each type is transmitted or the number of symbols in which all uplink control information is transmitted.

Embodiment 1

When the terminal configured to transmit uplink data through uplink slot aggregation transmits uplink control information, embodiment 1 proposes a method of determining slots for transmitting uplink control information requested by the BS among the scheduled uplink transmission slots.

The BS may configure a request for transmitting uplink control information and transmission of uplink data by the terminal to the terminal through one downlink control channel. Accordingly, the terminal configured to receive the request for transmitting uplink control information from the BS and transmit uplink data through aggregation of N uplink slots should define slots for transmitting the requested uplink control information. Therefore, the disclosure proposes definition of slots for transmitting the requested uplink control information through at least one of the following proposal methods.

Method 1: uplink scheduling information may add a field indicating the location of slots for transmitting uplink control information. The terminal may transmit uplink control information or CSI information in the configured slots according to a value of the field. At this time, the field used for indicating the slots for transmitting the uplink control information may be a field existing only in a terminal in which uplink slot aggregation is configured, and the size of the field may vary depending on the number of slots belonging to a maximum of uplink slot aggregation configured in the terminal. For example, when the number of slots belonging to the maximum of uplink slot aggregation is 4, the field indicating the location of slots for transmitting the uplink control information may be a 4-bit map or may be used for indicating one of the locations of one or more predefined slots through a 2-bit bitstream. For example, 00 indicates that uplink control information is transmitted in a first slot and 11 indicates uplink control information is transmitted in a last slot. At this time, one of the locations of one or more predefined slots may be indicated using 1 bit.

Method 2: the BS configures the location of slots for transmitting uplink control information using a value of a field for requesting to transmit uplink control information or CSI information among uplink scheduling information transmitted through a downlink control channel in order to configure uplink data transmission in the terminal. For example, uplink scheduling information which the BS transmits to the terminal may include the field making the request for transmitting uplink control information. At this time, the BS may select uplink control information or CSI information which the BS requests to the terminal according to the value of the field. For example, the BS may request uplink control information or CSI information for different cells to the terminal according to the value of the field. The terminal transmitting uplink data and uplink control information through one or more uplink transmission slots may configure the location of slots for transmitting the requested uplink control information using the value of the field. For example, when the field consists of a 2-bit bitstream, at least one bitstream (for example, 00) means that no request for uplink control information is made to the terminal. The remaining bitstream (for example, 11) may means that a request for transmitting uplink control information or CSI information for particular cells predefined in the terminal or configured through a higher layer signal is made and also the uplink control information is transmitted to particular slot k (for example, the last slot) among uplink transmission slots. At this time, transmission of the particular bitstream (for example, 11) in the last slot among the slots belonging to uplink slot aggregation is only an example, and mapping between uplink transmission request fields and uplink control information transmission slots may be predefined or configured in the terminal by the BS through a higher layer signal or may be differently defined according to the size of uplink transmission aggregated slots. Method 3: when the terminal configured to transmit uplink data through uplink slot aggregation transmits uplink control information, second type uplink control information and third type uplink control information are transmitted using one or more slots other than the slots for transmitting first type uplink control information among the scheduled uplink transmission slots.

A time point at which the terminal transmits the result (HARQ-ACK or first type uplink control information) of downlink data transmission from the BS may be predefined (for example, after n1 slots from reception of downlink data) or may be directly configured through scheduling information of transmission of the downlink data. For example, when the terminal is configured to transmit the result of the downlink data to the BS in the slot 503 of FIG. 5 through downlink scheduling information, the terminal may transmit second type uplink control information and third type control information in one or more slots among the slots other than the slot 503 for transmitting first type uplink control information among the slots in which transmission of the uplink data is configured, for example, in the slot 501. If when the first type uplink control information is transmitted in the slot in which transmission of the uplink control information is configured through method 1 or method 2, second type uplink control information and third type uplink control information may be transmitted together in the slot in which first type uplink control information is transmitted, or second type uplink control information and third type uplink control information may be transmitted in one slot among the slots in which no first type uplink control information is transmitted among the slots after the slot in which transmission of uplink control information is configured through method 1 or method 2.

At this time, although it is assumed that the second type uplink control information and the third type uplink control information are transmitted in one uplink transmission slot in embodiment 1, at least the third type uplink control information may be transmitted in one or more transmission slots through embodiment 2 proposed by the disclosure. A method of determining the slot for transmitting uplink control information proposed by embodiment may determine only a slot for transmitting second type uplink control information or determining the slot for transmitting the second type uplink control information and a slot for starting transmission of third type uplink control information.

Embodiment 2

Embodiment 2 proposes a method of minimizing deterioration of uplink data transmission quality due to transmission of uplink control information by allowing the terminal transmitting uplink data through one or more uplink transmission slots to transmit one or more pieces of uplink control information through one or more slots among a plurality of slots in which the uplink data is transmitted.

When the terminal transmits all of the uplink control information and the uplink data in one slot, some of the time and frequency resources which should be used for transmitting the uplink data in the slot should be used for the uplink control information. An uplink data transmission coding rate may increase according to an amount of the uplink control information transmitted in the slot, and accordingly, the uplink data transmission quality may deteriorate. Referring to FIG. 8A, when uplink control information 808, 809, and 810 and uplink data 807 are transmitted through one slot 800 among a plurality of uplink data transmission slots 800, 801, and 802, a coding rate of uplink data in the slot 808 in which the uplink control information is transmitted may become higher than a coding rate of uplink data in the slots 809 and 810 in which no uplink control information is transmitted and thus the uplink data transmission quality in the slot 800 in which the uplink control information is transmitted may deteriorate. In other words, since some of the time-frequency resources which can be used for transmitting uplink data in the slot 800 are used for transmitting one or more pieces of uplink control information 808, 809, and 810 in the slot 800, an amount of the time-frequency resources which can be used for transmitting the uplink data in the slot 800 may decrease compared to the other slots 801 and 802, thereby deteriorating the uplink data transmission quality. At this time, deterioration of the data transmission quality may be large or small depending on the size of transmitted uplink control information or the number of symbols in which uplink control information is transmitted. Accordingly, there is a need of a method of preventing the difference in the uplink data transmission quality between slots and deterioration of the uplink data transmission quality in the slot in which uplink control information is transmitted by allowing the terminal transmitting uplink data through one or more uplink transmission slots to transmit uplink control information in one or more slots among a plurality of slots in which the uplink data is transmitted.

Hereinafter, the disclosure proposes a method of minimizing deterioration of uplink data transmission quality due to transmission of uplink control information by allowing the terminal transmitting uplink data through one or more uplink transmission slots to transmit one or more pieces of uplink control information through one or more slots among a plurality of slots in which the uplink data is transmitted.

At this time, the method of transmitting uplink control information through one or more uplink transmission slots proposed by the disclosure may be differently applied according to the type of transmitted uplink control information. For example, first type uplink control information and second type uplink control information having a relatively small size of transmission information may be transmitted through one or more uplink transmission slots, and third type uplink control information having a relatively large size of transmission information compared to the first type uplink control information and the second type uplink control information may be transmitted through one or more uplink transmission slots by distributing overhead or the lack of uplink data transmission resources generated due to delivery of control information to slots. At this time, the method of transmitting uplink control information through one or more uplink transmission slots proposed by the disclosure can be applied to first type uplink control information and second type uplink control information, but for more easily and briefly describing the main subject of the disclosure, it is assumed that only the third type uplink control information is transmitted through one or more uplink transmission slots except for the case in which there is an additional explanation.

The method by which the terminal transmitting uplink data proposed by the disclosure transmits one or more pieces of uplink control information through one or more slots among a plurality of slots in which the uplink data is transmitted may vary depending on a scheme for transmitting the uplink data through the one or more uplink transmission slots and the transmitted uplink control information. When the terminal receiving a configuration to transmit uplink data through N uplink transmission slots 803 from the BS receives a request for transmitting uplink control information through uplink scheduling information, the terminal may use the N uplink transmission slots 803 for transmitting one uplink data or repeatedly transmitting one transport block. In other words, when one uplink data 807 is repeatedly transmitted through N uplink transmission slots 800, 801, and 802, some or all of the uplink control information of the terminal may be repeatedly transmitted through the N uplink transmission slots.

Figure 8B:
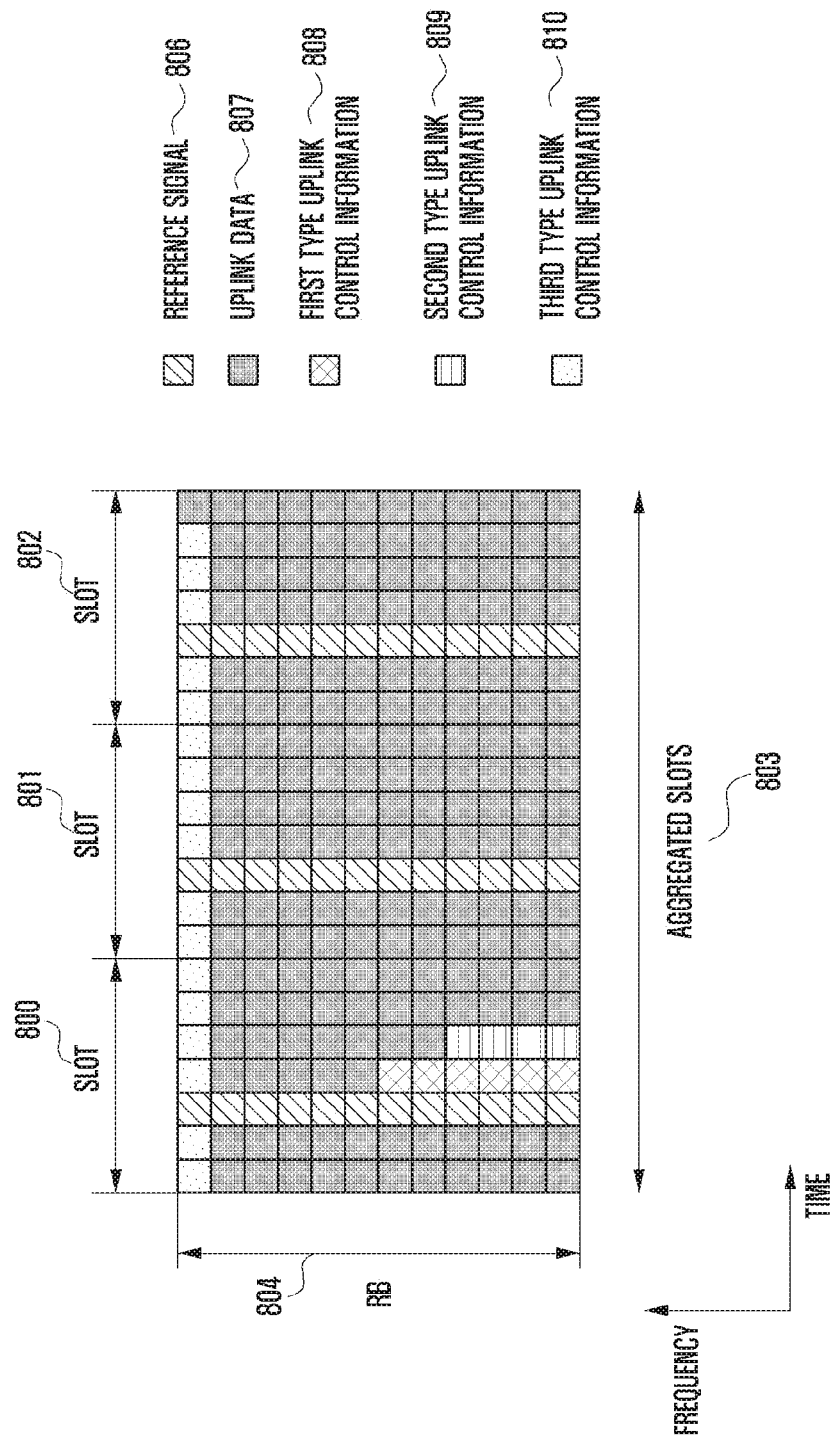

In another example, the N uplink transmission slots may be used for transmitting one uplink data or one transport block as illustrated in FIG. 8B. In other words, when one uplink data 807 is transmitted using N uplink transmission slots 800, 801, and 802, uplink control information or CSI information may be transmitted using one or more uplink transmission slots. For example, third type uplink control information 810 having a relatively large size of transmitted information compared to other control information may be transmitted through K uplink transmission slots among the N uplink transmission slots and thus control information transmission load may be distributed to transmission slots. First type uplink control information 808 and second type uplink control information 809 may be transmitted in a particular uplink transmission slot (for example, the slot 800) among the N uplink transmission slots. At this time, K may be equal to or smaller than N. The slot in which at least one piece of the first type uplink control information 808 and the second type uplink control information 809 is transmitted may be determined using one or more of method 1, method 2, and method 3 proposed by the disclosure. At this time, the slot in which uplink control information is transmitted, determined using one or more of method 1, method 2, and method 3 proposed by the disclosure may be used for transmitting second type uplink control information. The first type uplink control information 808 may be defined at a predetermined transmission time point, for example, after p slots or Q ms from reception of a downlink data signal, or information on the time point of the first type uplink control information 808 may be transmitted while being inserted into downlink data scheduling information transmitted by the BS, and the slot for transmitting the first type uplink control information 808 may be determined according to the information.

In another example, the N uplink transmission slots may be used for transmitting N uplink data or N transport blocks as illustrated in FIG. 8C. In other words, when one uplink data is transmitted in every uplink transmission slot in which transmission is configured, uplink control information of the terminal may be transmitted in one or more slots among the n uplink transmission slots. At this time, some of the uplink control information, for example, the first type uplink control information 808 may be transmitted in one slot 800 among the N uplink transmission slots. Other uplink control information, for example, the third type uplink control information 810 may be transmitted using K uplink transmission slots 800, 801, and 802 among the N uplink transmission slots. At this time, K may be equal to or smaller than N. The slot in which at least one piece of the first type uplink control information 808 and the second type uplink control information 809 is transmitted may be determined using one or more of method 1, method 2, and method 3 proposed by the disclosure. At this time, the slot in which uplink control information is transmitted, determined using one or more of method 1, method 2, and method 3 proposed by the disclosure may be used for transmitting second type uplink control information. The first type uplink control information 808 may be defined at a predetermined transmission time point, for example, after p slots or Q ms from reception of a downlink data signal, or information on the time point of the first type uplink control information 808 may be transmitted while being inserted into downlink data scheduling information transmitted by the BS, and the slot for transmitting the first type uplink control information 808 may be determined according to the information.

At least the third type uplink control information 810 among the uplink control information transmitted in the K slots may be transmitted differently for each slot. For example, when the BS requests transmitting CSI information for one or more cells, carriers, or BSs (hereinafter, referred to as cells) or transmitting CSI information for one or more CSI processes to the terminal, the terminal may transmit CSI information for cells or CSI processes different for each slot included in the K slots for transmitting the uplink control information or CSI information. For example, it is assumed that the terminal receiving a configuration to transmit uplink data through aggregated uplink transmission slots from the BS is scheduled to transmit three pieces of different uplink data through three uplink transmission slots 800, 801, and 802. When the BS requests reporting CSI information for four cells (for example, cell1, cell2, cell3, and cell4) to the terminal through the uplink scheduling information, the terminal may report the CSI information for the four cells through one or more slots. At this time, it is assumed that the slot for transmitting uplink data and the slot for transmitting control information are the same as each other in the present embodiment. That is, it is assumed that N=K. In other words, the terminal may transmit uplink control information or CSI information for the four cells along with uplink data through three slots. When transmitting the CSI information through the three slots, the terminal may transmit CSI information for one or more cells or CSI processes through each slot. In other words, CSI information for cell 1 may be transmitted in slot 1 800, CSI information for cell 2 may be transmitted in slot 2 801, CSI information for slot 3 may be transmitted in slot 3 802, and CSI information for cell 4 may be transmitted in slot 1 800 More generally, the terminal may report CSI information through all of the data-scheduled slots or transmit CSI information through some of the data-scheduled slots. The number of slots used for transmitting CSI information may be pre-defined or configured by the BS. Further, the number of slots used for transmitting the CSI information may be determined according to the number of data-scheduled slots or according to the number of cells or CSI processes of which transmission is requested from the BS. Thereafter, the terminal may sequentially map and transmit CSI information to the BS in the order from the lowest cell ID or cell index among cells for which the CSI report is requested from the BS sequentially through the slots used for transmitting CSI information in the order from the slot having the lowest slot index. In other words, at least third type uplink control information 812 among the CSI information for cell1 may be transmitted through the first slot 800, at least third type uplink control information 814 among the CSI information for cell1 may be transmitted in the second slot 801, and at least third type uplink control information 816 among the CSI information for cell3 may be transmitted in the third slot 802 in FIG. 8C. If the number of cells or processes for which transmission of CSI information is requested from the BS is larger than the number of slots used for transmitting CSI information, the terminal may sequentially map and transmit CSI information in the order from the lowest cell ID or cell index among the cells for which the CSI report is requested from the BS sequentially through the slots used for transmitting CSI information in the order from the slot having the lowest slot index. That is, referring to the above embodiment, the third type uplink control information among the CSI information for cell4 may be transmitted again in the first slot 801. In other words, the third type uplink control information transmitted in the slot 800 is third type uplink control information for cell1 and cell4.

At this time, second type uplink control information for the cells may be transmitted in the slot in which the third type uplink control information of each cell is transmitted. In other words, as illustrated in FIG. 8C, the second type uplink control information and the third type uplink control information of each cell may be transmitted in the same cell. That is, second type uplink control information 820 and third type uplink control information 812 of cell1 and cell4 may be transmitted in the slot 800, second type uplink control information 822 and third type uplink control information 814 of cell2 may be transmitted in the slot 801, and second type uplink control information 824 and third type uplink control information 816 of cell3 may be transmitted in the slot 802. In other words, second type uplink control information and third type uplink control information for at least one cell or one CSI process may be transmitted in the same slot.

At this time, second type uplink control information 909 for cells or CSI processes for which transmission of CSI information is requested from the BS may be transmitted through some of slots 900, 901, and 902 in which third type uplink control information 910 is transmitted. For example, as illustrated in FIGS. 9A and 9B, the second type uplink control information 909 may be transmitted in both the slot 900 and the slot 901. The slot in which at least one piece of control information among the second type uplink control information 909 is transmitted may be determined using one or more of method 1, method 2, and method 3 proposed by the disclosure. The slot in which uplink control information determined using one or more method 1, method 2, and method 3 proposed by the disclosure is transmitted may be used for transmitting the second type uplink control information 909, and the first type uplink control information 908 may be defined at a predetermined transmission time point, for example, after P slots or Q ms from reception of a downlink data signal or may be transmitted while information on the time point at which the first type uplink control information 908 is transmitted may be inserted into downlink data scheduling information transmitted by the BS, and the slot for transmitting the first type uplink control information 908 may be determined according to the information.

Embodiment 3

Figure 10A:
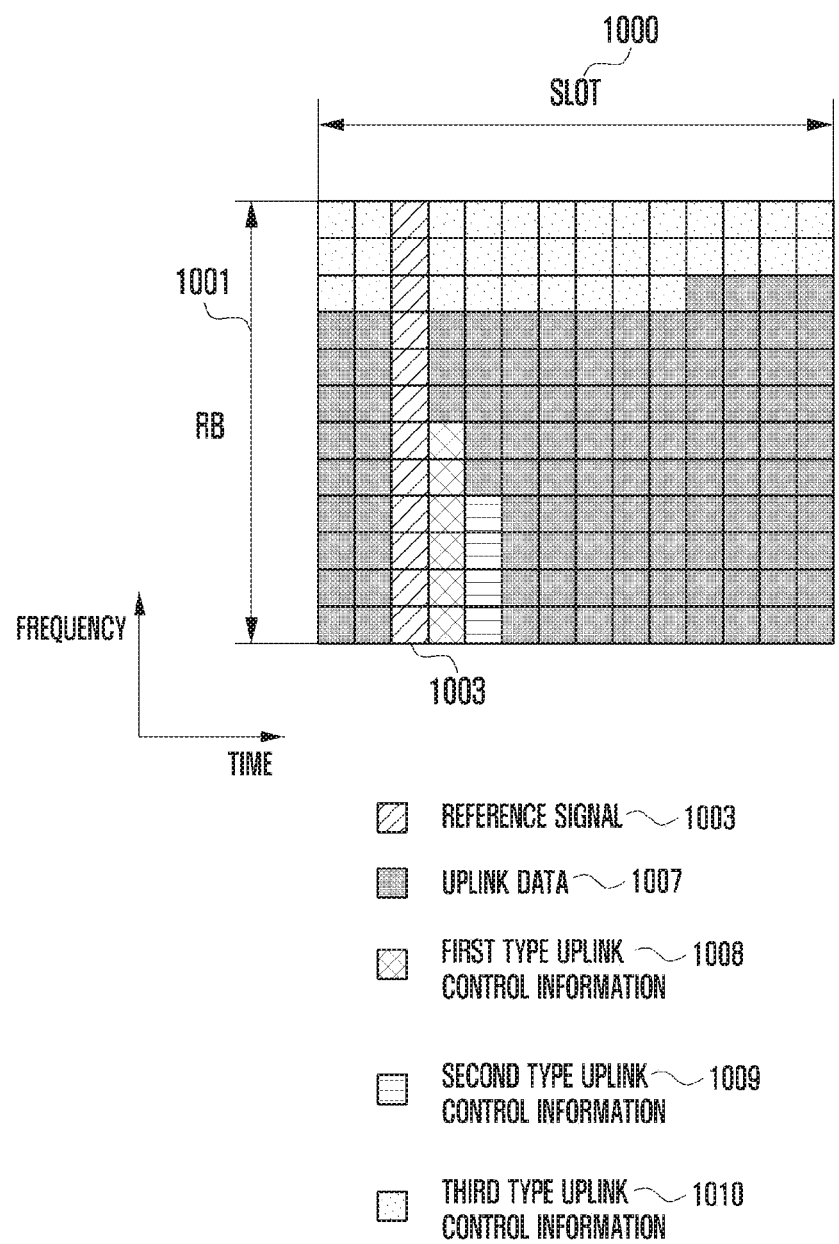

Embodiment 3 proposes a method of transmitting uplink control information or CSI information according to a configuration of reference signals within a slot. In other words, the method of transmitting at least one piece of uplink control information among the uplink control information (for example, the uplink control information transmission location) may vary depending on the number and location of symbols in which reference signals are transmitted within the uplink transmission slot. FIG. 10A illustrates the case in which one reference signal 1003 is transmitted in one uplink transmission slot 1000. As described in the embodiments and the disclosure, the BS may estimate an uplink channel of the terminal based on the reference signal transmitted by the terminal and decode the uplink signal. That is, as resources through which uplink control information is transmitted are farther from resources through which the reference signal is transmitted, channel estimation and signal reception performance for the uplink time-frequency resource region may further deteriorate. Accordingly, it is better to transmit first type uplink control information 1007 and second type uplink control information 1008 of which the transmission quality is relatively more important among the uplink control information as close to the reference signal 1003 as possible as illustrated in FIG. 10A. In FIG. 10A, it is assumed that first and second symbols of the slot may be symbols in which downlink control information can be transmitted or guard intervals for switching time from downlink to uplink. Further, it is assumed that the first type uplink control information 1007 or the second type uplink control information 1008 is transmitted in the first symbol in which uplink control information can be transmitted among symbols after the reference signal 1003. The first type uplink control information 1007 and the second type uplink control information 1008 can be transmitted in a symbol before the reference signal (for example, the second symbol of the slot 1000) according to the configuration of the slot 1000 (for example, the case in which all symbols of the slot are used for uplink transmission). Although it is assumed that the first type uplink control information 1007 and the second type uplink control information 1008 are transmitted in different symbols in the slot 1000 of FIG. 10A, the first type uplink control information 1007 and the second type uplink control information 1008 can be transmitted in the same symbol.

Figure 10B:
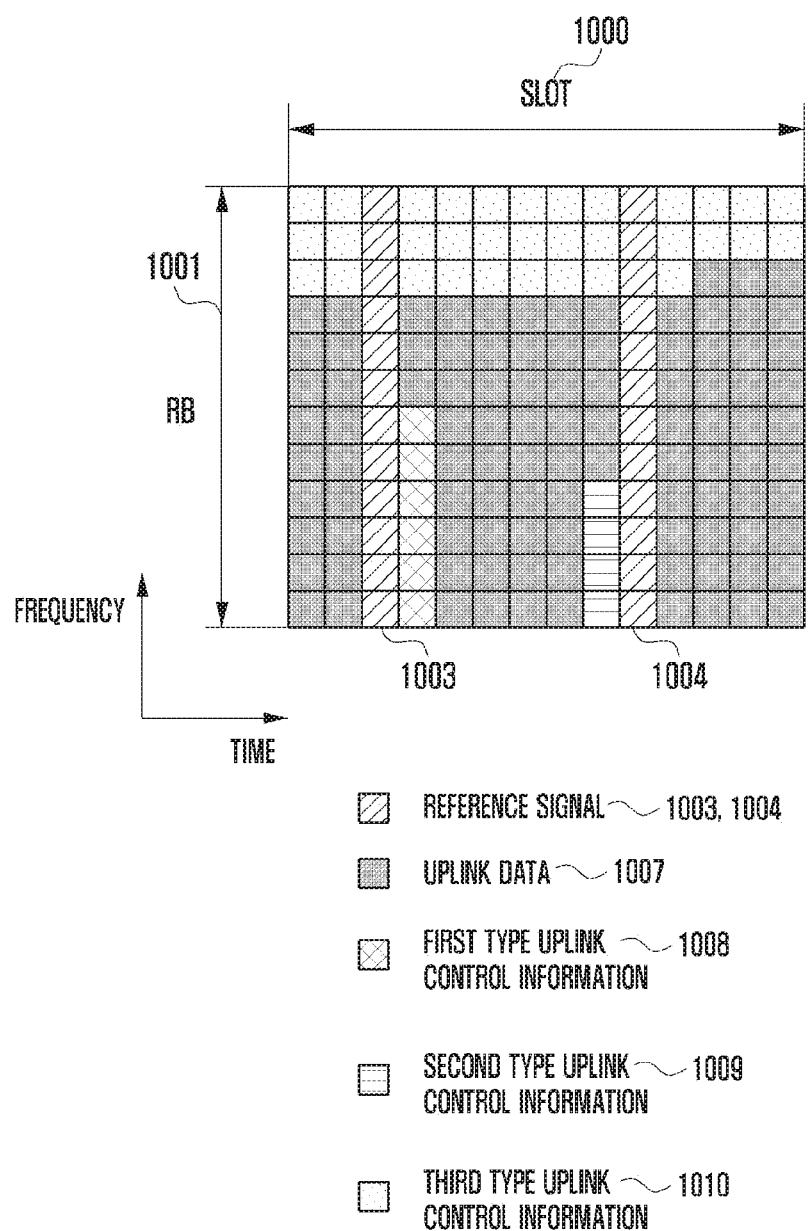

The BS may additionally transmit the reference signal within the slot in order to improve the uplink channel estimation quality and the uplink data reception performance of the terminal (including a high-speed mobile terminal of which a channel is rapidly changed according to the time). As illustrated in FIG. 10B, the BS may instruct or configure the terminal to transmit a reference signal 1004 in addition to the basic reference signal 1003 in the configured uplink transmission slot. At this time, the BS may instruct or configure the terminal to additionally transmit the reference signal 1004 through uplink scheduling information or configure the terminal to transmit the reference signal 1004 in addition to the basic reference signal 1003 in the uplink transmission slot through a higher layer signal. In another method, the terminal may determine whether to transmit the additional reference signal 1004 according to the slot structure in the slot in which uplink transmission is scheduled. For example, when the downlink control channel transmission symbol or the guard interval is included in the uplink slot which is uplink-scheduled by the BS, the terminal may transmit only the basic reference signal 1003 without the additional reference signal 1004. On the other hand, when the downlink control channel transmission symbol or the guard interval is not included in the uplink slot which is uplink-scheduled by the BS, the terminal may transmit the basic reference signal 1003 and the additional reference signal 1004. At this time, the terminal may determine whether the downlink control channel transmission symbol or the guard interval is included in the uplink-scheduled slot structure or the slot before reception of the uplink-scheduled slot through a common control channel or a group common control channel transmitted by the BS. Meanwhile, the basic reference signal 1003 illustrated in FIG. 10B may be different from the basic reference signal 1003 illustrated in FIG. 10A.

If the terminal transmits the basic reference signal 1003 and the additional reference signal 1004 as illustrated in FIG. 10B, it is preferable to transmit uplink control information in the symbol closest to the reference signal in order to improve the uplink control information transmission quality as described in the disclosure and other embodiments. That is, when a plurality of reference signals is transmitted as illustrated in FIG. 10B, the first type uplink control information 1007 and the second type uplink control information 1008 may be transmitted while being separated before or after the reference signal. In general, when the BS receives the result of downlink data which the terminal receives from the BS as soon as possible, the BS may start rapider retransmission or new initial transmission. Accordingly, when the plurality of reference signals is transmitted as illustrated in FIG. 10B, the reference signals are transmitted in one or more symbols, or when the reference signals are transmitted in one or more symbols and there are one or more symbol intervals between the reference signals, the first type uplink control information 1007 can be transmitted in symbols closest to the reference signals 1003 among the symbols immediately before or after the first reference signals 1003 transmitted in the slot and in which uplink control information can be transmitted. Further, the second type uplink control information 1008 can be transmitted in symbols closest to the reference signals 1004 among the symbols immediately before or after the second reference signals 1004 or the last reference signals transmitted in the slot and in which the uplink control information can be transmitted. That is, the disclosure proposes a method of transmitting the first type uplink control information 1007 to the BS as rapidly as possible and increasing the uplink control information transmission quality.

Embodiment 4

Embodiment 4 proposes a method of minimizing deterioration of the uplink data transmission quality due to transmission of uplink control information when the terminal transmitting uplink data through one or more uplink transmission slots transmits at least one piece of uplink control information through one or more slots among a plurality of slots in which the uplink data is transmitted. In the present embodiment, the BS may configure the terminal to transmit uplink control information and data in one or more uplink transmission slots through uplink scheduling information transmitted through a downlink control channel. At this time, it is assumed that some of information transmitted through the uplink scheduling information (for example, time-frequency resource allocation information, MCS, and transmission power information) is commonly applied to the configured slots, but one or more pieces of the information may be defined in every slot and included in scheduling information.

When the terminal transmits both the uplink control information and the uplink data in one slot, some of the time and frequency resources used for transmitting the uplink data in the slot should be used for the uplink control information, so that an uplink data transmission coding rate may increase according to an amount of the uplink control information transmitted in the slot and thus the uplink data transmission quality may deteriorate. A more detailed example will be described below with reference to FIG. 8A. When uplink control information 808, 809, and 810 and uplink data 807 are transmitted through one slot 800 among a plurality of uplink data transmission slots 800, 801, and 802, a coding rate of uplink data in the slot 808 in which the uplink control information is transmitted may become higher than a coding rate of uplink data in the slots 809 and 810 in which no uplink control information is transmitted and thus the uplink data transmission quality in the slot 800 in which the uplink control information is transmitted may deteriorate. That is, since some of the time-frequency resources used for transmitting the uplink data in the slot 800 are used for transmitting one or more pieces of uplink control information 808, 809, and 810, an amount of the time-frequency resources which can be actually used for transmitting the uplink data in the slot 800 may decrease compared to the other slots 801 and 802, and thus the uplink data transmission quality in the slot 800 may deteriorate. The deterioration of data transmission quality may be small or large according to the size of the transmitted uplink control information or the number of symbols in which the uplink control information is transmitted. Accordingly, there is a need of a method of preventing deterioration of the uplink data transmission quality in the slot in which the terminal transmitting uplink data through one or more uplink transmission slots transmits both the uplink data and the uplink control information.

Hereinafter, the disclosure provides a method, when the terminal scheduled to transmit uplink data through one or more uplink transmission slots simultaneously transmits at least one piece of uplink control information and the uplink data through the slot in which at least one piece of uplink data is transmitted, configuring the slots such that the slot in which at least one piece of control information for the slot in which the uplink control information and the uplink data are transmitted is transmitted is different from the slot in which only the uplink data is transmitted without the uplink control information. That is, the disclosure proposes a method of minimizing deterioration of the uplink data transmission quality which may be generated due to simultaneous transmission of the uplink control information and the uplink data.

Method 1: the BS may add at least one value of an MCS value or an MCS offset value applied to uplink transmission in the slot in which uplink control information and uplink data are transmitted to uplink scheduling information transmitted to the terminal, thereby minimizing deterioration of the uplink data transmission quality which may be generated due to simultaneous transmission of the uplink control information and the uplink data. That is, an MCS value for uplink transmission in the slot in which only the uplink data is transmitted without uplink control information and an MCS value or an MCS offset value for uplink transmission in the slot in which both the uplink control information and the uplink data are transmitted may be transmitted to the terminal while being inserted into uplink scheduling information. At this time, the MCS value for uplink transmission in the slot in which both the uplink control information and the uplink data are transmitted may be configured to use a smaller value, a lower modulation scheme, or a lower coding rate compared to the MCS value in the slot in which only the uplink data is transmitted without the uplink control information. Accordingly, it is possible to minimize deterioration of the uplink data transmission quality which may be generated in simultaneous transmission of the uplink control information and the uplink data. At this time, when the MCS offset value is transmitted, the MCS offset may be configured as an offset value for the MCS value applied to transmission of the uplink data without transmission of the uplink control information, and the MCS offset value may include a negative value including 0.

Method 2: the BS may add frequency resource region information (resource allocation) applied to uplink transmission in the slot in which both the uplink control information and the uplink data are transmitted to uplink scheduling information transmitted to the terminal, thereby minimizing deterioration of the uplink data transmission quality which may be generated due to simultaneous transmission of the uplink control information and the uplink data. That is, frequency resource region information for uplink transmission in the slot in which only the uplink data is transmitted without the uplink control information and frequency resource region information for uplink transmission in the slot in which both the uplink control information and the uplink data are transmitted may be transmitted to the terminal while being inserted into uplink scheduling information. At this time, the frequency resource region for uplink transmission in the slot in which both the uplink control information and the uplink data are transmitted may be configured generally as a larger value than that of the frequency resource region in the slot in which only the uplink data is transmitted without the uplink control information. Accordingly, it is possible to minimize deterioration of the uplink data transmission quality in the slot by using more frequency resources in the slot in which both the uplink control information and the uplink data are transmitted. The frequency resource region in the slot in which both the uplink control information and the uplink data are transmitted may be adaptively changed according to valid resource region information which can be actually used for uplink data transmission (for example, the number of symbols in which uplink data is transmitted or the number of REs in which uplink data is transmitted). The frequency resource region information in the slot in which both the uplink control information and the uplink data are transmitted may not be included in uplink scheduling information. In other words, the BS may configure the frequency resource region in the slot in which both the uplink control information and the uplink data are transmitted according to valid resource region information which can be used for uplink data transmission based on the frequency resource region in the slot in which uplink data is transmitted, included in the uplink scheduling information.

Method 3: it is possible to minimize deterioration of the uplink data transmission quality which may be generated in the slot in which both the uplink control information and the uplink data are transmitted by configuring the size or uplink data transmitted without uplink control information or a transport block size (TBS) value differently from the size of uplink data in the slot in which both the uplink control information and the uplink data are transmitted or a TBS value. The TBS value may be determined without separate signaling through the MCS included in the uplink data transmission scheduling information and time-frequency resource allocation information or may be determined without separate signaling through the size of the resource region valid for data transmission among the MCS included in the uplink data transmission scheduling information and time-frequency resource allocation information. In general, the size of uplink data in the slot in which both the uplink control information and the uplink data are transmitted or the TBS value may be configured to be smaller than the size of uplink data transmitted without uplink control information or the TBS value. Accordingly, it is possible to minimize deterioration of the uplink data transmission quality in the slot by transmitting a smaller amount of uplink data compared to the slot in which both the uplink control information and the uplink data are transmitted. At this time, the TBS for uplink transmission in the slot in which both the uplink control information and the uplink data are transmitted may be configured to be the same as the TBS for uplink transmission in the slot in which only the uplink data is transmitted without uplink control information.

The BS may add the uplink data transmission size in the slot in which both the uplink control information and the uplink data are transmitted, in other words, the TBS value or the TBS offset value to uplink scheduling information transmitted to the terminal, thereby configuring the size of uplink data transmitted without the uplink control information or the TBS value differently from the size of uplink data in the slot in which both the uplink control information and the uplink data are transmitted or the TBS value.

In another method, the BS may configure the uplink transmission TBS value in the slot in which both the uplink control information and the uplink data are transmitted based on the valid resource region which can be actually used for transmitting the uplink data in the slot (for example, at least one of the number of symbols in which the uplink data is transmitted or the number of REs in which the uplink data is transmitted) without adding information on the uplink data transmission size in the slot in which both the uplink control information and the uplink data are transmitted to uplink scheduling information. That is, the terminal may reduce the uplink transmission TBS value in the slot in which both the uplink control information and the uplink data are transmitted in proportion to valid resources for transmission of the uplink data in the slot in which both the uplink control information and the uplink data are transmitted based on the uplink transmission TBS value in the slot in which only the uplink data is transmitted without the uplink control information configured by the BS or may configure the TBS value according to predefined values or predefined ratios based on one or more references for a resource region valid for transmission of the uplink data in the slot. At this time, the uplink transmission TBS value in the slot in which both the uplink control information and the uplink data are transmitted may be configured to be the same as the uplink transmission TBS value in the slot in which only the uplink data is transmitted without the uplink control information according to the size of uplink control information or the number of symbols in which uplink control information is transmitted.

In another method, the terminal may configure the uplink transmission TBS value in the slot in which both the uplink control information and the uplink data are transmitted according to the MCS value included in the uplink scheduling information, the time and frequency resource region information included in the uplink scheduling information, and an amount of valid resources which can be used for transmitting the uplink data in the slot in which both the uplink control information and the uplink data are transmitted without adding information on the uplink data transmission size in the slot in which both the uplink control information and the uplink data are transmitted to the uplink scheduling information. In other words, the TBS value for uplink data transmission in the slot in which both the uplink control information and the uplink data are transmitted may be configured using one or more of method 1, method 2, and method 3. That is, the TBS value may be configured according to the method proposed by the disclosure based on at least one of the MCS value or the MCS offset value included in the uplink scheduling information, time and frequency resource region information included in the uplink scheduling information, or time and frequency resource region information which can be used for transmitting uplink data in the slot.

At this time, determining the TBS value according to the valid resource region information which can be used for transmitting data proposed by the disclosure (for example, the number of symbols used for transmitting data or the number of REs used for transmitting data) may be applied to configuring the TBS value for downlink transmission as well as uplink. Further, it is assumed that data is transmitted through one or more slots, but the method of configuring the TBS value according to the valid resource region information which can be used for transmitting data proposed by the disclosure (for example, the number of symbols used for transmitting data or the number of REs used for transmitting data) may be applied to not only the case in which the data is transmitted through one slot but also the case in which data is transmitted using a mini slot which is defined to be a smaller size than the slot, or the case in which data is transmitted using a smaller number of symbols than the symbols included in one slot.

Method 4: the BS may add configuration information of transmission power in the slot in which both the uplink control information and the uplink data are transmitted to uplink scheduling information transmitted to the terminal. Accordingly, it is possible to minimize deterioration of the uplink data transmission quality by increasing transmission power in the slot in which both the uplink control information and the uplink data are transmitted. That is, the uplink transmission power configuration information in the slot in which both the uplink control information and the uplink data are transmitted may be transmitted to the terminal while being inserted into the uplink scheduling information. At this time, the uplink transmission power configuration information in the slot in which both the uplink control information and the uplink data are transmitted may be configured as an offset value for uplink data transmission power transmitted without uplink control information and configured as a positive value including 0. Further, the uplink transmission power configuration information in the slot in which both the uplink control information and the uplink data may be configured according to a preset value which is not included in the uplink scheduling information or a value configured through a higher layer signal. In other words, uplink transmission power in the slot in which both the uplink control information and the uplink data are transmitted may be predefined to be transmitted with an increase of X dBm, Y dB, or Z times compared to uplink data transmission power transmitted without the uplink control information or may be configured as one of values X, Y, and Z through a higher layer signal. At this time, uplink transmission power information in the slot in which both the uplink control information and the uplink data are transmitted may be configured differently according to an amount of the transmitted uplink control information or an amount of valid resources used for transmitting the uplink data in the slot.

Figure 11:
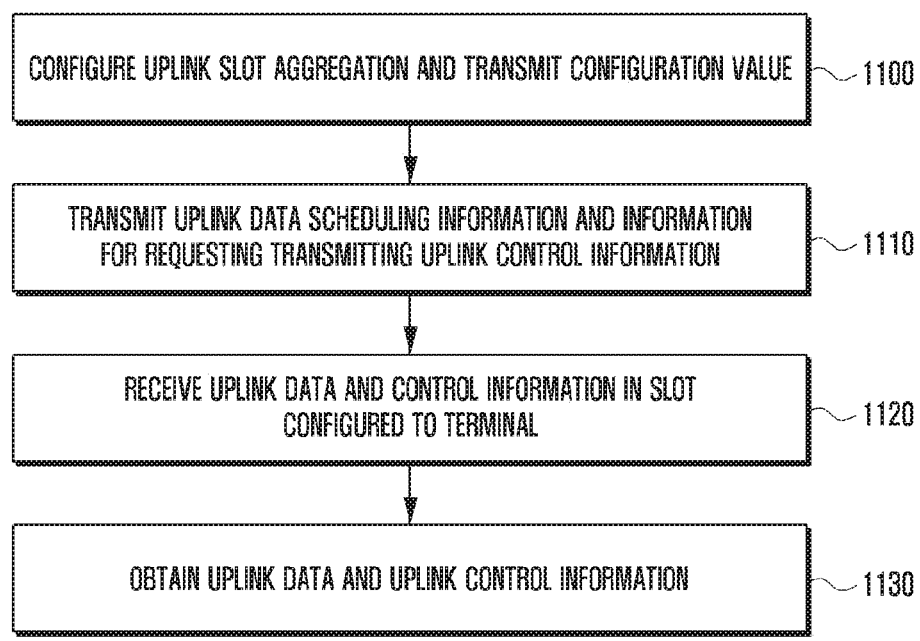
FIG. 11 is a flowchart illustrating a BS operation for a method proposed by the disclosure.

Subsequently, a BS operation for requesting for transmitting uplink data and uplink control information to the terminal through one or more uplink transmission slots will be described with reference to FIG. 11.

In step 1100, the BS configures whether to perform slot aggregation for uplink transmission to the terminal supporting uplink slot aggregation and transmits configuration values required for performing uplink slot aggregation including a maximum number of slots used for uplink slot aggregation to the terminal through a higher layer signal. In step 1110, the BS may transmit uplink data scheduling information to a terminal receiving a request for resources for uplink data transmission or terminals requiring uplink data transmission through a downlink control channel. When the BS desires to receive uplink control information or CSI information from the terminal, the BS may insert information for requesting transmitting uplink control information into uplink data scheduling information transmitted to the terminal. When the BS desires to receive uplink control information or CSI information of the terminal even though the terminal has received no request for resources for uplink data transmission, the BS may request transmitting uplink control information to the terminal without uplink data scheduling information transmitted to the terminal. At this time, the BS may schedule uplink transmission resources for transmitting uplink control information for which the request is received by the terminal from the BS. If the BS configures the terminal to transmit uplink data or uplink control information through one or more slots, the BS may configure slots in which the control information is transmitted in the terminal through embodiment 1, embodiment 2, and embodiment 3 proposed by the disclosure. When the BS configures the terminal to transmit uplink data or uplink control information through one or more slots, the BS may receive uplink data and uplink control information from the terminal through the configured slots in step 1120, and may decode the received uplink data and uplink control information and acquire uplink data and uplink control information in step 1130.

Figure 12:
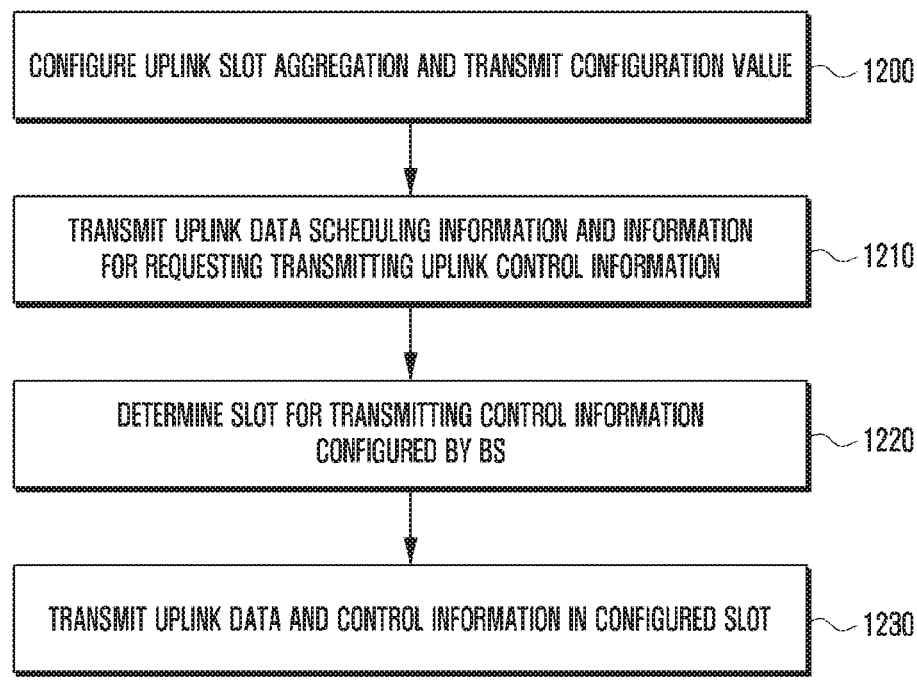
FIG. 12 is a flowchart illustrating a terminal operation for a method proposed by the disclosure.

Next, an operation of the terminal receiving a configuration of transmission of uplink data and uplink control information using one or more uplink transmission slots from the BS will be described through FIG. 12.

In step 1200, the terminal supporting uplink slot aggregation transmits information on whether uplink slot aggregation is supported to the BS and receives configuration values required for performing uplink slot aggregation including the configuration indicating whether slot aggregation of uplink transmission is performed and a maximum number of slots used for uplink slot aggregation from the BS through a higher layer signal. In step 1210, the terminal receives configuration information on one or more uplink transmissions among uplink data scheduling information and uplink control information transmission request information transmitted through a downlink control channel from the BS. If when the received uplink scheduling information is configured such that the BS transmits uplink data or uplink control information through one or more slots, the terminal determines slots for transmitting the control information through embodiments 1, 2, and 3 proposed by the disclosure in step 1220 and transmits uplink data and control information in the configured slots in step 1230.

Figure 13:
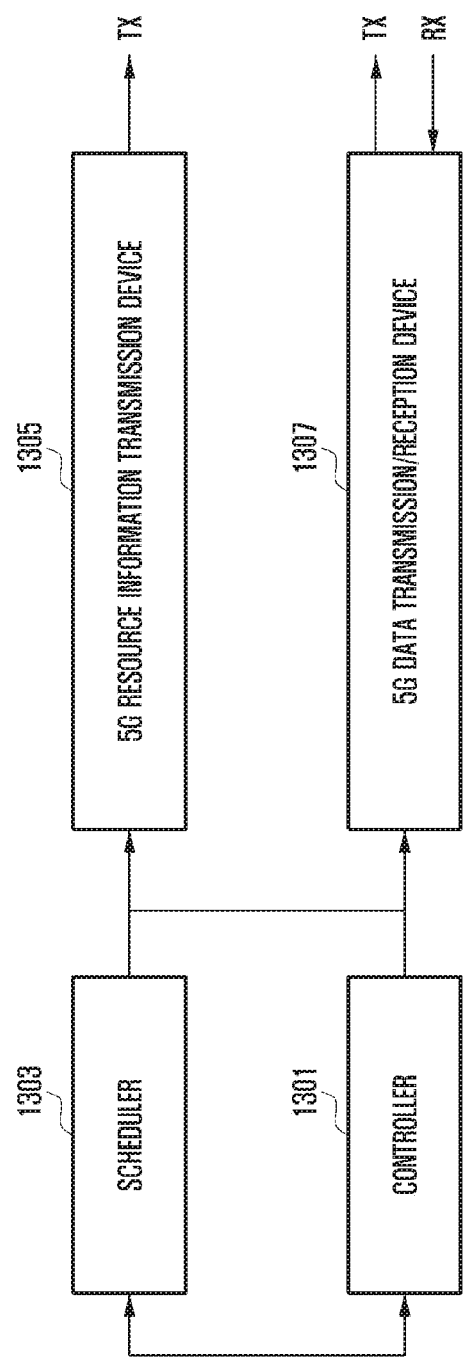
FIG. 13 illustrates a BS apparatus according to the disclosure.

Next, FIG. 13 illustrates a BS apparatus according to the disclosure.

A controller 1301 controls BS and terminal procedures and slots for transmitting uplink data and uplink control information according thereto to transmit data scheduling information configured in the terminal through a 5G resource information transmission device 1305, schedule 5G data in 5G resources through a scheduler 1303, and transmit and receive 5G data and control information to and from a 5G terminal through a 5G transmission/reception device 1307.

Figure 14:
FIG. 14 illustrates a terminal apparatus according to the disclosure.

Next, FIG. 14 illustrates a terminal apparatus according to the disclosure.

A controller 1401 receives, from the BS, BS and terminal procedures, and uplink data scheduling information and information on slots for transmitting uplink control information transmitted from the BS through a 5G resource information reception device 1405, and transmits and receives 5G data scheduled in the allocated 5G resources to and from the 5G BS through a 5G data transmission/reception device 1406.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiments of the disclosure may be combined to operate a base station and a terminal. Further, although the above embodiments have been described based on the NR system, it may be possible to implement other variant embodiments based on the technical idea of the embodiments in other systems such as FDD or TDD LTE systems.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments based on the spirits of the disclosure besides the embodiments disclosed herein can be carried out.

The invention claimed is:

1. A method performed by a terminal in a communication system, the method comprising:
   receiving, from a base station, downlink control information (DCI) including first information on a first modulation and coding scheme (MCS) used for transmitting uplink control information (UCI) and uplink data in one slot, second information on a second MCS used for transmitting the uplink data in one slot, third information on resources for a physical uplink shared channel (PUSCH), and fourth information on a transmission power offset used for transmitting the UCI and the uplink data in one slot;
   in case that the UCI and the uplink data are to be transmitted in a slot, identifying a number of resource elements (REs) for the uplink data in the slot, based on a value obtained by subtracting a number of REs for the UCI in the slot from a number of REs for the PUSCH in the slot;
   identifying a transport block size (TBS) based on the number of the REs for the uplink data in the slot and the first MCS; and
   transmitting, to the base station, the UCI and the uplink data in the slot based on the identified TBS,
   wherein a transmission power for the UCI and the uplink data in the slot is identified based on the transmission power offset, and
   wherein the transmission power offset is identified based on the number of the REs for the uplink data in the slot.

2. The method of claim 1, wherein the UCI includes at least one of hybrid automatic repeat request (HARQ) information, and channel state information (CSI).

3. The method of claim 1, wherein the DCI further includes an indicator for requesting to transmit channel state information (CSI).

4. The method of claim 1, further comprising:
   receiving, from the base station, configuring information for transmitting the UCI and the uplink data through a plurality of slots;
   in case that a number of slots for transmitting the UCI and the uplink data is determined to be plural, distributing the UCI to each of the plurality of slots; and
   transmitting, to the base station, the UCI and the uplink data through the plurality of slots based on the identified TBS.

5. A method performed by a base station in a communication system, the method comprising:
   transmitting, to a terminal, downlink control information (DCI) including first information on a first modulation and coding scheme (MCS) used for transmitting uplink control information (UCI) and uplink data in one slot, second information on a second MCS used for transmitting the uplink data in one slot, third information on resources for a physical uplink shared channel (PUSCH), and fourth information on a transmission power offset used for transmitting the UCI and the uplink data in one slot; and receiving, from the terminal, the UCI and the uplink data in a slot based on a transport block size (TBS), wherein a number of resource elements (REs) for the uplink data in the slot is identified based on a value obtained by subtracting a number of REs for the UCT in the slot from a number of REs of the resources for the PUSCH, wherein the TBS is identified based on the number of the REs for the uplink data in the slot and the first MCS, wherein a transmission power for the UCI and the uplink data in the slot is identified based on the transmission power offset, and wherein the transmission power offset is identified based on the number of the REs for the uplink data in the slot.

6. The method of claim 5, wherein the UCI includes at least one of hybrid automatic repeat request (HARQ) information, and channel state information (CSI).

7. The method of claim 5, wherein the DCI further includes an indicator for requesting to transmit channel state information (CSI).

8. The method of claim 5, further comptising:
transmitting, to the terminal, configuration information for receiving the UCI and the uplink data through a plurality of slots; and
receiving, from the terminal, the UCI and the uplink data through the plurality of slots based on the TBS,
wherein the UCI is distributed to each of the plurality of slots.

9. A terminal in a communication system, the terminal comprising:
a transceiver; and
a controller coupled with the transceiver and configured to:
receive, from a base station, downlink control information DCI including first information on a first modulation and coding scheme (MCS) used for transmitting uplink control information (UCI) and uplink data in one slot, second information on a second MCS used for transmitting the uplink data in one slot, third information on resources for a physical uplink shared channel (PUSCH), and fourth information on a transmission power offset used for transmitting the UCI and the uplink data in one slot,
in case that the UCI and the uplink data are to be transmitted in a slot, identify a number of resource elements (REs) for the uplink data in the slot based on a value obtained by subtracting a number of REs for the UCI within the slot from a number of REs of the resources for the PUSCH in the slot,
identify a transport block size (TBS) based on the number of the REs for the uplink data in the slot and the first MCS, and transmit, to the base station, the UCI and the uplink data in the slot based on the identified TBS,
wherein a transmission power for the UCI and the uplink data in the slot is identified based on the transmission power offset, and
wherein the transmission power offset is identified based on the number of the REs for the uplink data in the slot.

10. The terminal of claim 9, wherein the UCI includes at least one of hybrid automatic repeat request (HARQ) information, and channel state information (CSI).

11. The terminal of claim 9, wherein the DCI further includes an indicator for requesting to transmit channel state information (CSI).

12. The terminal of claim 9, wherein the controller is further configured to:
receive, from the base station, configuring information for transmitting the UCI and the uplink data through a plurality of slots,
in case that a number of slots for transmitting the UCI and the uplink data is determined to be plural, distribute the UCI to each of the plurality of slots, and
transmit, to the base station, the UCI and the uplink data through the plurality of slots based on the identified TBS.

13. A base station (BS) in a communication system, the BS cornprising
a transceiver; and
a controller coupled with the transceiver and configured to:
transmit, to a terminal, downlink control information (DCI) including first information on a first modulation and coding scheme (MCS) used for transmitting uplink control information (UCI) and uplink data in one slot, second information on a second MCS used for transmitting the uplink data in one slot, third information on resources for a physical uplink shared channel (PUSCH), and fourth information on a transmission power offset used for transmitting the UCI and the uplink data in one slot, and
receive, from the terminal, the UCI and the uplink data in a slot based on a transport block size (TBS),
wherein a number of resource elements (REs) for the uplink data in the slot is identified based on a value obtained by subtracting a number of REs for the UCI in the slot from a number of REs of the resources for the PUSCH in the slot,
wherein the TBS is identified based on the number of the REs for the uplink data in the slot and the first MCS,
wherein a transmission power for the UCI and the uplink data in the slot is identified based on the transmission power offset, and
wherein the transmission power offset is identified based on the number of the REs for the uplink data in the slot.

14. The BS of claim 13, wherein the UCI includes at least one of hybrid automatic repeat request (HARQ) information, and channel state information (CSI), and
wherein the DCI further includes an indicator for requesting to transmit the CSI.

15. The BS of claim 13, wherein the controller is further configured to:
transmit, to the terminal, configuration information for receiving the UCI and the uplink data through a plurality of slots, and
receive, from the terminal, the UCI and the uplink data through the plurality of slots based on the TBS,
wherein the UCI is distributed to each of the plurality of slots.

16. The BS of claim 13, wherein, in case that the uplink data is to be transmitted in the slot, the second. MCS is used to identify a TBS, and
wherein the first MCS corresponds to a lower coding rate or modulation scheme than the second MCS.

17. The method of claim 1, wherein, in case that the uplink data is to be transmitted in the slot, the second MCS is used to identify a TBS, and wherein the first MCS corresponds to a lower coding rate or modulation scheme than the second MCS.

18. The method of claim 5, wherein, in case that the uplink data is to be transmitted in the slot, the second MCS is used to identify a TBS, and wherein the first MCS corresponds to a lower coding rate or modulation scheme than the second MCS.

19. The terminal of claim 9, wherein, in case that the uplink data is to be transmitted in the slot, the second MCS is used to identify a TBS, and wherein the first MCS corresponds to a lower coding rate or modulation scheme than the second MCS.

* * * * *